US010992502B2

(12) United States Patent
Su et al.

(10) Patent No.: US 10,992,502 B2
(45) Date of Patent: Apr. 27, 2021

(54) METHOD FOR SENDING DOWNLINK CONTROL INFORMATION, TERMINAL DEVICE, AND NETWORK DEVICE

(71) Applicant: HUAWEI TECHNOLOGIES CO., LTD., Guangdong (CN)

(72) Inventors: Liyan Su, Beijing (CN); Yubo Yang, Shanghai (CN); Chaojun Li, Beijing (CN); Brian Classon, Palatine, IL (US); Yan Cheng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/730,314

(22) Filed: Dec. 30, 2019

(65) Prior Publication Data

US 2020/0136867 A1 Apr. 30, 2020

Related U.S. Application Data

(63) Continuation of application No. PCT/CN2017/116020, filed on Dec. 13, 2017.

(30) Foreign Application Priority Data

Nov. 17, 2017 (WO) ................ PCT/CN2017/111753

(51) Int. Cl.
*H04L 25/03* (2006.01)
*H04W 72/04* (2009.01)
(Continued)

(52) U.S. Cl.
CPC ..... *H04L 25/03929* (2013.01); *H04B 7/0456* (2013.01); *H04L 5/0051* (2013.01);
(Continued)

(58) Field of Classification Search
None
See application file for complete search history.

(56) References Cited

U.S. PATENT DOCUMENTS 10,375,580 B2 * 8/2019 Zhu ........................ H04L 1/0026
2014/0133395 A1 5/2014 Nam et al.
(Continued)

FOREIGN PATENT DOCUMENTS

CN 101801101 A 8/2010
CN 102315870 A 1/2012
(Continued)

OTHER PUBLICATIONS

3GPP TS 36.212 V14.4.0 (Sep. 2017), "3rd Generation Partnership Project; Technical Specification Group Radio access Network; Evolved Universal Terrestrial Radio Access (E-UTRA); Multiplexing and channel coding (Release 14)," Sep. 2017, 198 pages.
(Continued)

*Primary Examiner* — Ruihua Zhang
(74) *Attorney, Agent, or Firm* — Fish & Richardson P.C.

(57) ABSTRACT

Embodiments of this application provide a method for sending downlink control information, a terminal device, and a network device, and relate to the communications field, to resolve problems of low flexibility and low reliability of a system DCI configuration. The method includes: receiving DCI for scheduling downlink data to be transmitted as one codeword, wherein the DCI comprises a value of a set of values each indicating a corresponding quantity of layers of the one codeword and one or more antenna ports used for sending the one codeword, and wherein the set of values comprises: a first value indicating that the quantity of layers of the one codeword is 2, and a first antenna port and a second antenna port are used for sending the one codeword, and a second value indicating that the quantity of
(Continued)

layers of the one codeword is 2 and a third antenna port and a fourth antenna port are used for sending the one codeword.

12 Claims, 12 Drawing Sheets

(51) Int. Cl.
    *H04W 72/12*     (2009.01)
    *H04L 5/10*     (2006.01)
    *H04L 5/00*     (2006.01)
    *H04B 7/0456*     (2017.01)

(52) U.S. Cl.
    CPC ............. *H04L 5/10* (2013.01); *H04W 72/042* (2013.01); *H04W 72/1273* (2013.01)

(56) References Cited

U.S. PATENT DOCUMENTS

| | | | |
|---|---|---|---|
| 2017/0230994 | A1 | 8/2017 | You et al. |
| 2018/0332572 | A1 | 11/2018 | Liu et al. |
| 2019/0068308 | A1* | 2/2019 | Shin .................. H04L 27/26 |

FOREIGN PATENT DOCUMENTS

| | | |
|---|---|---|
| CN | 103024807 A | 4/2013 |
| CN | 103947130 A | 7/2014 |
| CN | 106455066 A | 2/2017 |
| CN | 106470087 A | 3/2017 |
| CN | 106470088 A | 3/2017 |
| CN | 106973437 A | 7/2017 |
| CN | 107231691 A | 10/2017 |
| CN | 107295671 A | 10/2017 |
| CN | 109391413 A | 2/2019 |
| EP | 2890034 A1 * | 7/2015 ............... H04L 1/00 |
| EP | 2890034 A1 | 7/2015 |
| WO | 2016159730 A1 | 10/2016 |
| WO | 2017194022 A1 | 11/2017 |

OTHER PUBLICATIONS

3GPP TS 38.211 V1.0.0 (Sep. 2017), "3rd Generation Partnership Project; Technical Specification Group Radio Access Network; NR; Physical channels and modulation (Release 15)," Sep. 2017, 37 pages.
3GPP TS 38.212 V1.0.0 (Sep. 2017), "3rd Generation Partnership Project; Technical Specification Group Radio Access Network; NR; Multiplexing and channel coding (Release 15)," Sep. 2017, 28 pages.
PCT International Search Report and Written Opinion issued in International Application No. PCT/CN2017/111753 dated Aug. 3, 2018, 13 pages (with English translation).
Office Action issued in Chinese Application No. 201780090774.X dated Aug. 27, 2020, 21 pages.
Huawei, "Introduction of shortened processing time and shortened TTI into 36.212," 3GPP TSG RAN WG1 Meeting #90bis, R1-1719234, Prague, Czech, Oct. 9-13, 2017, 63 pages.
Office Action issued in Chinese Application No. 201911227079.0 dated Aug. 12, 2020, 15 pages (with English translation).
Extended European Search Report issued in European Application No. 17932443.9 dated Nov. 26, 2020, 10 pages.
Vivo, "Remaining details on DMRS design," 3GPP TSG RAN WG1 NR Ad Hoc #3, R1-1715623, Nagoya, Japan, Sep. 18-21, 2017, 10 pages.
Office Action issued in Chinese Application No. 201911227079.0 dated Nov. 4, 2020, 6 pages (with English translation).
Qualcomm Incorporated, "DCI for SPS," 3GPP TSG RAN WG1 Meeting #87, R1-1613253, Reno, USA Nov. 14-18, 2016, 4 pages.

\* cited by examiner

METHOD FOR SENDING DOWNLINK CONTROL INFORMATION, TERMINAL DEVICE, AND NETWORK DEVICE

CROSS-REFERENCE TO RELATED APPLICATIONS

This application is a continuation of International Application No. PCT/CN2017/116020, filed on Dec. 13, 2017, which claims priority to International Application No. PCT/CN2017/111753, filed on Nov. 17, 2017. The disclosures of the aforementioned applications are hereby incorporated by reference in their entireties.

TECHNICAL FIELD

This application relates to the communications field, and in particular, to a method for sending downlink control information, a terminal device, and a network device.

BACKGROUND

In a long term evolution (LTE) system, a data transmission rate can be increased by folds by using a multiple-input multiple-output (MIMO) technology. A plurality of antennas are used on both a transmitter and a receiver to establish a plurality of parallel transmission channels, so that bandwidth utilization can be improved without reducing power efficiency. Each antenna port can transmit one reference signal (RS). User equipment (UE) may obtain a channel estimate of a corresponding antenna port based on the RS, for demodulation of data transmitted on the antenna port. Each antenna port corresponds to a group of resource elements (RE) that are used to transmit the RS. The transmitter obtains a codeword after performing operations such as channel coding and rate matching on data of a transport block (TB). After scrambling, modulation, layer mapping, transform precoding, and precoding, the codeword is mapped to a physical resource, for data transmission in one or more subframes. Precoding is a process of mapping a transport layer to an antenna port by using a precoding matrix.

To support downlink transmission of a plurality of transport layers, a transmission mode (TM) 9 is introduced in LTE, and downlink transmission of a maximum of eight transport layers and a maximum of eight antenna ports is supported. Because a quantity of transmission layers may dynamically change, a quantity of transmitted UE-specific reference signals also changes accordingly. Therefore, a structure of a UE-specific reference signal dynamically changes. A base station (Evolved NodeB, eNB) needs to notify the UE of a quantity of transmission layers in corresponding downlink control information (DCI), so that the UE learns a structure of a UE-specific reference signal used in a current subframe, and how a PDSCH is mapped to the UE. Specifically, the base station may transmit, in a DCI format 2C, dynamic information required by multilayer transmission, and the dynamic information includes indication information for an antenna port, a scrambling identity (SCID), and a quantity of transmission layers. Several predefined tables are stored on both a receive end and a transmit end. The base station may indicate, by using higher layer signaling, a table that the UE should look up, and then indicate a group of specific parameters in the table by using one to four bits carried in the DCI. As can be learned, downlink transmission performance of a plurality of transport layers depends on a table of indication information of an antenna port, a scrambling code ID, and a quantity of transmission layers. Currently, in an LTE system, three tables in total are designed for various scenarios, as shown in Table 1, Table 2, and Table 3.

TABLE 1

3-bit indication information for an antenna port, a scrambling code ID, and a quantity of transmission layers

| One codeword enabled | | Two codewords enabled | |
| --- | --- | --- | --- |
| Value | Message | Value | Message |
| 0 | 1 layer, port 7, $n_{SCID} = 0$ | 0 | 2 layers, ports 7 and 8, $n_{SCID} = 0$ |
| 1 | 1 layer, port 7, $n_{SCID} = 1$ | 1 | 2 layers, ports 7 and 8, $n_{SCID} = 1$ |
| 2 | 1 layer, port 8, $n_{SCID} = 0$ | 2 | 3 layers, ports 7 to 9 |
| 3 | 1 layer, port 8, $n_{SCID} = 1$ | 3 | 4 layers, ports 7 to 10 |
| 4 | 2 layers, ports 7 and 8 | 4 | 5 layers, ports 7 to 11 |
| 5 | 3 layers, ports 7 to 9 | 5 | 6 layers, ports 7 to 12 |
| 6 | 4 layers, ports 7 to 10 | 6 | 7 layers, ports 7 to 13 |
| 7 | Reserved | 7 | 8 layers, ports 7 to 14 |

TABLE 2

4-bit indication information for an antenna port, a scrambling code ID, and a quantity of transmission layers

| One codeword enabled | | Two codewords enabled | |
| --- | --- | --- | --- |
| Value | Message | Value | Message |
| 0 | 1 layer, port 7, $n_{SCID} = 0$ (OCC = 2) | 0 | 2 layers, ports 7 and 8, $n_{SCID} = 0$ (OCC = 2) |
| 1 | 1 layer, port 7, $n_{SCID} = 1$ (OCC = 2) | 1 | 2 layers, ports 7 and 8, $n_{SCID} = 1$ (OCC = 2) |
| 2 | 1 layer, port 8, $n_{SCID} = 0$ (OCC = 2) | 2 | 2 layers, ports 7 and 8, $n_{SCID} = 0$ (OCC = 4) |
| 3 | 1 layer, port 8, $n_{SCID} = 1$ (OCC = 2) | 3 | 2 layers, ports 7 and 8, $n_{SCID} = 1$ (OCC = 4) |
| 4 | 1 layer, port 7, $n_{SCID} = 0$ (OCC = 4) | 4 | 2 layers, ports 11 and 13, $n_{SCID} = 0$ (OCC = 4) |
| 5 | 1 layer, port 7, $n_{SCID} = 1$ (OCC = 4) | 5 | 2 layers, ports 11 and 13, $n_{SCID} = 1$ (OCC = 4) |
| 6 | 1 layer, port 8, $n_{SCID} = 0$ (OCC = 4) | 6 | 3 layers, ports 7 to 9 |
| 7 | 1 layer, port 8, $n_{SCID} = 1$ (OCC = 4) | 7 | 4 layers, ports 7 to 10 |
| 8 | 1 layer, port 11, $n_{SCID} = 0$ (OCC = 4) | 8 | 5 layers, ports 7 to 11 |
| 9 | 1 layer, port 11, $n_{SCID} = 1$ (OCC = 4) | 9 | 6 layers, ports 7 to 12 |
| 10 | 1 layer, port 13, $n_{SCID} = 0$ (OCC = 4) | 10 | 7 layers, ports 7 to 13 |
| 11 | 1 layer, port 13, $n_{SCID} = 1$ (OCC = 4) | 11 | 8 layers, ports 7 to 14 |
| 12 | 2 layers, ports 7 and 8 | 12 | Reserved |
| 13 | 3 layers, ports 7 to 9 | 13 | Reserved |
| 14 | 4 layers, ports 7 to 10 | 14 | Reserved |
| 15 | Reserved | 15 | Reserved |

TABLE 3

1-bit indication information for an antenna port, a
scrambling code ID, and a quantity of transmission layers
One codeword enabled or two codewords enabled

| Value | Message |
|---|---|
| 0 | 2 layers, ports 7 and 8, $n_{SCID} = 0$ |
| 1 | 2 layers, ports 7 and 8, $n_{SCID} = 1$ |

A maximum of eight antenna ports are supported in the TM 9 in LTE. However, actually, not all systems support such a large quantity of antenna ports, for example, a short transmission time interval (sTTI) system supported by LTE In this case, a large quantity of values in Table 1 and Table 2 are not supported by the sTTI system. In other words, for a non-eight-antenna-port system, there are redundant scenarios in Table 1 and Table 2, and consequently, indication information for an antenna port, a scrambling code ID, and a quantity of transmission layers occupy excessive bits. In addition, unnecessary information is carried in DCI, and consequently, DCI flexibility and reliability are reduced.

SUMMARY

Embodiments of this application provide a method for sending downlink control information, a terminal device, and a network device, to resolve problems of low flexibility and low reliability of a system DCI configuration.

According to a first aspect, a method for sending downlink control information is provided, where the method includes: receiving downlink control information DCI, where the DCI includes indication information, and the indication information is used to indicate at least one of a quantity of layers, an antenna port, and a scrambling identity that are used by a network device during downlink data transmission; and determining, based on the indication information, at least one of the quantity of layers, the antenna port, and the scrambling identity that are used by the network device during downlink data transmission. A terminal device may receive the DCI. For example, the terminal device may be UE. The network device and the terminal device store a correspondence table between the indication information and at least one of the quantity of layers, the antenna port, and the scrambling identity. When the terminal device receives the indication information, the terminal device may determine, based on the indication information, at least one of the quantity of layers, the antenna port, and the scrambling identity that are used by the network device during downlink transmission. Each antenna port transmits one reference signal. The terminal device may obtain a channel estimate of the antenna port based on the reference signal, for demodulation of data transmitted on the antenna port. In this embodiment of this application, the table stored in the network device and the terminal device may be a newly configured table in this application. The newly configured table includes a newly added scheme. Compared with an existing table, the newly configured table in this application is more flexible, and can improve DCI transmission reliability and system transmission efficiency.

According to a second aspect, a method for sending downlink control information is provided, where the method includes: generating downlink control information DCI, where the DCI includes indication information, and the indication information is used to indicate at least one of a quantity of layers, an antenna port, and a scrambling identity that are used by a network device during downlink data transmission: and sending the DCI.

According to a third aspect, a terminal device is provided, including: a receiver, configured to receive downlink control information DCI, where the DCI includes indication information, and the indication information is used to indicate at least one of a quantity of layers, an antenna port, and a scrambling identity that are used by a network device during downlink data transmission; and a processor, configured to determine, based on the indication information, at least one of the quantity of layers, the antenna port, and the scrambling identity that are used by the network device during downlink data transmission.

According to a fourth aspect, a network device is provided, including: a processor, configured to generate downlink control information DCI, where the DCI includes indication information, and the indication information is used to indicate at least one of a quantity of layers, an antenna port, and a scrambling identity that are used by a network device during downlink data transmission; and a transmitter, configured to send the DCI.

In the first aspect to the fourth aspect:

In a possible design, there is only one codeword in the downlink data transmission, the indication information indicates a scheme m or a scheme n, the quantity of layers in each of the scheme m and the scheme n is 2, and the antenna ports in the scheme m and the antenna ports in the scheme n are different. In the existing Table 1, Table 2, and Table 3, when only one codeword is enabled, if the quantity of layers is 2, there is one possibility for a quantity of corresponding antenna ports. However, in a solution configured in this application, when the quantity of layers is 2, antenna ports in different schemes are different. Because transmission efficiency of the terminal device during use of each antenna port resource is not exactly the same, the base station can more flexibly indicate an antenna port resource to the UE. In this way, the base station can select an antenna port resource with highest transmission efficiency to serve the UE, thereby improving the system transmission efficiency.

In a possible design, an indication range of the indication information includes at least the following seven schemes, where: in a first scheme, the quantity of layers is 1, and the antenna port is x; in a second scheme, the quantity of layers is 1, and the antenna port is y; in a third scheme, the quantity of layers is 2, and the antenna ports are x and y; in a fourth scheme, the quantity of layers is 2, and the antenna ports are x and z; in a fifth scheme, the quantity of layers is 2, and the antenna ports are y and w; in a sixth scheme, the quantity of layers is 3, and the antenna ports are x, y, and z; and in a seventh scheme, the quantity of layers is 4, and the antenna ports are x, y, z, and w, where the scheme m includes the quantity of layers and the antenna ports in the fourth scheme, and the scheme n includes the quantity of layers and the antenna ports in the fifth scheme. Compared with the existing table, in the newly configured table including the seven schemes, indication information that may not be supported in an sTTI system and a scheme corresponding to the indication information are deleted, and the fourth scheme and the fifth scheme are added. For a base station, optional antenna ports for the base station increase, and the base station may select the antenna port resource with the highest transmission efficiency to serve the UE, thereby improving the system transmission efficiency.

In a possible design, a quantity of bits occupied by the indication information is greater than or equal to 1 and less than 3, the indication information indicates that the quantity of layers is a first quantity of layers or a second quantity of layers, and the first quantity of layers and the second quantity of layers are not equal. In this design, compared with the existing Table 1 and Table 2, in the newly configured table, the indication information occupies a reduced quantity of bits, signaling overheads of the DCI are reduced, and different schemes may correspond to different quantities of layers.

In a possible design, an indication range of the indication information includes a maximum of four schemes but at least two schemes in the following schemes, where: in a first scheme, the quantity of layers is 1, and the antenna port is x; in a second scheme, the quantity of layers is 2, and the antenna ports are x and y; in a third scheme, the quantity of layers is 3, and the antenna ports are x, y, and z; and in a fourth scheme, the quantity of layers is 4, and the antenna ports are x, y, z, and w, where when the first quantity of layers and the second quantity of layers are not equal, the first quantity of layers and the second quantity of layers are each a quantity of layers in any one of the four schemes. Compared with the existing Table 1 and Table 2, in this design, the four schemes include four combinations of quantities of layers and antenna ports in total, and the newly configured table in the four schemes needs a maximum of 2-bit indication information. A quantity of bits for carrying the DCI in a PDCCH is reduced while the signaling overheads of the DCI are reduced. In this case, more bits in the PDCCH are encoded redundancy bits. A larger quantity of redundancy bits indicates higher DCI transmission reliability. In the scheme in Table 3, the corresponding quantity of layers is only two. Compared with the existing Table 3, in this design, the quantities of layers include one to four. For the network device, the network device can more flexibly indicate, to the UE by using the indication information, a quantity of layers used during data transmission. Because transmission efficiency of the UE during data transmission by using different quantities of layers is not exactly the same, the base station may select a quantity of layers for data transmission with highest transmission efficiency to serve the UE, to improve the system transmission efficiency.

In a possible design, when only one codeword of the terminal device is in an enabled state, the indication information indicates a scheme p or a scheme q, the quantity of layers in each of the scheme p and the scheme q is 1, and the scrambling identity in the scheme p and the scrambling identity in the scheme q are different; or the indication information indicates a scheme r or a scheme s, the quantity of layers in each of the scheme r and the scheme s is 2, and the scrambling identity in the scheme r and the scrambling identity in the scheme s are different. In this design, a table may be configured for a multi-user scheduling case of the network device and the terminal device. In the table, a quantity of layers for data transmission can be more flexibly indicated to the terminal device while different scrambling codes are indicated to a plurality of users, so that the terminal device can support a multi-user multiple-input multiple-output scenario.

In a possible design, an indication range of the indication information includes at least the following eight schemes, where: in a first scheme, the quantity of layers is 1, the antenna port is x, and the scrambling identity is 0; in a second scheme, the quantity of layers is 1, the antenna port is x, and the scrambling identity is 1; in a third scheme, the quantity of layers is 1, the antenna port is y, and the scrambling identity is 0; in a fourth scheme, the quantity of layers is 1, the antenna port is y, and the scrambling identity is 1; in a fifth scheme, the quantity of layers is 2, the antenna ports are x and y, and the scrambling identity is 0; in a sixth scheme, the quantity of layers is 2, the antenna ports are x and y, and the scrambling identity is 1; in a seventh scheme, the quantity of layers is 3, and the antenna ports are x, y, and z; and in an eighth scheme, the quantity of layers is 4, and the antenna ports are x, y, z, and w, where the scheme p includes the quantity of layers, the antenna port, and the scrambling identity in the first scheme, and the scheme q includes the quantity of layers, the antenna port, and the scrambling identity in the second scheme or the fourth scheme; or the scheme p includes the quantity of layers, the antenna port, and the scrambling identity in the second scheme, and the scheme q includes the quantity of layers, the antenna port, and the scrambling identity in the first scheme or the third scheme; and the scheme r includes the quantity of layers, the antenna ports, and the scrambling identity in the fifth scheme, and the scheme s includes the quantity of layers, the antenna ports, and the scrambling identity in the sixth scheme. In this design, when the network device performs multi-user scheduling, quantities of layers for data transmission that are indicated to different terminal devices may be different while different scrambling identities are indicated to different terminal devices. Because transmission efficiency of the terminal device during data transmission at different quantities of layers is not exactly the same, the base station can more flexibly indicate a quantity of layers for data transmission. In this case, the base station may select a quantity of layers for data transmission with highest transmission efficiency to serve the terminal device, to improve the system transmission efficiency.

According to a fifth aspect, a method for sending downlink control information is provided, where the method includes: receiving downlink control information DCI, where the DCI includes indication information, and the indication information is used to indicate a frequency domain resource used by a network device during downlink data transmission; and determining, based on the indication information, the frequency domain resource used by the network device during downlink data transmission. A terminal device may receive the DCI. For example, the terminal device may be UE. The network device and the terminal device store a correspondence between the indication information and the used frequency domain resource. When the terminal device receives the indication information, the terminal device may determine, based on the indication information, a frequency domain resource used by the network device during downlink transmission. The terminal device may receive downlink data on the frequency domain resource corresponding to the indication information. In this embodiment of this application, the correspondence stored in the network device and the terminal device may be a newly configured calculation formula in this application. Compared with an existing table, the newly configured calculation formula in this application is more flexible, and can improve system resource utilization efficiency.

According to a sixth aspect, a method for sending downlink control information is provided, where the method includes: generating downlink control information DCI, where the DCI includes indication information, and the indication information is used to indicate a frequency domain resource used by a network device during downlink data transmission; and sending the DCI.

According to a seventh aspect, a terminal device is provided, including: a receiver, configured to receive downlink control information DCI, where the DCI includes indication information, and the indication information is used to indicate a frequency domain resource used by a network device during downlink data transmission; and a processor, configured to determine, based on the indication information, the frequency domain resource used by the network device during downlink data transmission.

According to an eighth aspect, a network device is provided, including: a processor, configured to generate downlink control information DCI, where the DCI includes indication information, and the indication information is used to indicate a frequency domain resource used by the network device during downlink data transmission; and a transmitter, configured to send the DCI.

In the fifth aspect to the eighth aspect:

In a possible design, indication information corresponding to a resource indicator value RIV is 6-bit information, an indication range of the indication information includes 64 schemes, and a value range of the resource indicator value RIV is 0 to 63. When a value of the RIV is 11m+n (where m is greater than or equal to 0 and less than or equal to 5, n is greater than or equal to 0 and less than or equal to 10, and when in is equal to 5, n is not equal to 9 and 10), the frequency domain resource that is used by the network device during downlink data transmission and that is indicated by the indication information is m+1 short resource block groups SRBGs. Each SRBG includes four or five virtual resource blocks VRBs or physical resource blocks PRBs, and a VRB or PRB index corresponding to a start location is 2*n.

In a possible design, a calculation formula of the resource indicator value RIV is as follows:

$$RIV=11*(L-1)+RB_{start}/2,$$

where $RB_{start}$ is an index of a start VRB or a start PRB of a frequency resource allocated by a base station to UE, the index is equal to 2*n, L is a quantity of allocated consecutive SRBGs, and L=m+1.

In a possible design, indication information corresponding to a resource indicator value RIV is 6-bit information, an indication range of the indication information includes 64 schemes, and a value range of the resource indicator value RIV is 0 to 63. When a value of the RIV is 6m+n (where m is greater than or equal to 0 and less than or equal to 10, n is greater than or equal to 0 and less than or equal to 5, and when m is equal to 10, n is not equal to 4 and 5), the frequency domain resource that is used by the network device during downlink data transmission and that is indicated by the indication information is n+1 short resource block groups SRBGs. Each SRBG includes four or five virtual resource blocks VRBs or physical resource blocks PRBs, and a VRB or PRB index corresponding to a start location is 2*m.

In a possible design, a calculation formula of the resource indicator value RIV is as follows:

$$RIV=3*RB_{start}+L-1,$$

where $RB_{start}$ is an index of a start VRB or a start of PRB of a frequency resource allocated by a base station to UE, the index is equal to 2*n L is a quantity of allocated consecutive SRBGs, and L=n+1.

According to a ninth aspect, an embodiment of this application provides a computer storage medium, configured to store computer software instructions used by the foregoing network device and/or terminal device. The computer software instructions include a program designed for performing at least one of the first aspect, the second aspect, the fifth aspect, and the sixth aspect.

According to a tenth aspect, an embodiment of this application provides a computer program product including instructions, and when the computer program product runs on a computer, the computer performs the method according to at least one of the first aspect, the second aspect, the fifth aspect, and the sixth aspect.

The embodiments of this application provide the method for sending downlink control information, the terminal device, and the network device. The method may be: receiving DCI, where the DCI includes indication information, and the indication information is used to indicate at least one of a quantity of layers, an antenna port, and a scrambling identity that are used by a network device during downlink data transmission; and determining, based on the indication information, at least one of the quantity of layers, the antenna port, and the scrambling identity that are used by the network device during downlink data transmission. The terminal device may receive the DCI. For example, the terminal device may be UE. The network device and the terminal device store a correspondence table between the indication information and at least one of the quantity of layers, the antenna port, and the scrambling identity. When the terminal device receives the indication information, the terminal device may determine, based on the indication information, at least one of the quantity of layers, the antenna port, and the scrambling identity that are used by the network device during downlink transmission. Each antenna port transmits one reference signal. The terminal device may obtain a channel estimate of the antenna port based on the reference signal, for demodulation of data transmitted on the antenna port. In the embodiments of this application, the table stored in the network device and the terminal device may be a newly configured table in this application. The newly configured table includes a newly added scheme. Compared with an existing table, the newly configured table in this application is more flexible, and can improve DCI transmission reliability and system transmission efficiency.

DESCRIPTION OF EMBODIMENTS

Figure 1:
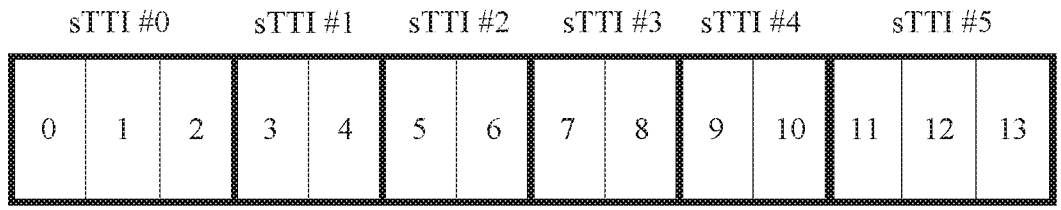
FIG. 1 is a schematic diagram of an sTTI with a length of two or three symbols according to an embodiment of this application.

For ease of understanding, example descriptions of some concepts related to this application are provided for reference, as shown below.

Time-frequency resource: In LTE a time-frequency resource is divided into an orthogonal frequency division multiplexing (OFDM) symbol or a single carrier frequency division multiple access (SC-FDMA) symbol in a time dimension, and a subcarrier in a frequency domain dimension, A smallest resource granularity is referred to as a resource element (RE), which represents a time-frequency grid point including one time domain symbol in time domain and one subcarrier in frequency domain. A typical time-frequency resource in an LTE system is based on a structure of a subcarrier spacing of 15 kHz, time domain symbol duration of approximately 70 μs, and cyclic prefix duration of approximately 4 μs to 6 μs, where 14 symbols are included per ms.

Scheduling time unit: Transmission of a service in an LIE system is based on base station scheduling. An upper-layer data packet is divided into small data packets in transport blocks when the upper-layer data packet is scheduled at a physical layer. A scheduling time unit is usually one subframe, and duration is 1 ms (because physical meanings of a transmission time interval TTI and a subframe are basically the same, the TTI and the subframe may be interchangeable). One subframe may include two slots, and one slot may include seven time domain symbols. In an LTE-evolved system, alternatively, there may be a shorter scheduling time unit, for example, a scheduling mode using one slot or even two or three time domain symbols as a unit. A scheduling time unit shorter than 1 ms is usually referred to as an sTTI.

Scheduling procedure: Usually, a base station sends control information (such as DCI) on a control channel (such as a physical uplink control channel (PUCCH) or a short physical uplink control channel (sPUCCH)). The control information indicates a hybrid automatic repeat request (HARQ) process number and scheduling information that correspond to a transport block TB on a physical downlink shared channel (PDSCH) or a physical uplink shared channel (PUSCH). The scheduling information includes control information such as resource allocation information (namely, a used time-frequency resource) and a modulation and coding scheme (MCS) index of the scheduled TB.

Spatial multiplexing: In an LTE system, a data transmission rate can be increased by folds by using a MIMO technology. In a MIMO system, a plurality of antennas are used on both a transmitter and a receiver to establish a plurality of parallel transmission channels, in other words, in addition to time and frequency domain resources, a spatial domain resource is introduced by using a plurality of antennas. This can provide very high bandwidth utilization without reducing power efficiency. In other words, a very high data rate can be provided on a limited bandwidth without drastically reducing coverage, and this is usually referred to as spatial multiplexing. Spatial multiplexing is mainly used to improve the data transmission rate. Data is divided into a plurality of streams, and the plurality of streams are sent at the same time.

TB: Data sent from a medium access control layer (MAC) layer to a physical layer is organized in a form of a TB. One TB corresponds to one data block. The data block is to be sent within one TTI. In addition, the data block is also a unit for HARQ retransmission. If UE does not support spatial multiplexing, a maximum of one TB is sent in one TTI. If UE supports spatial multiplexing, a maximum of two TBs are sent in one TTI.

Codeword (CW): A codeword is a data bitstream obtained after CRC insertion and code block segmentation are performed on a TB sent in a TTI, a cyclic redundancy check code (CRC) is inserted into each code block, and channel coding and rate matching are performed. Each codeword corresponds to one TB. Therefore, one UE sends a maximum of two codewords in one TTI. The codeword may be considered as a TB with error correction.

Transport layer: Layer mapping is performed on a modulation symbol obtained after one or two codewords CWs are scrambled and modulated, and then the modulation symbol is mapped to a maximum of four transport layers. Each layer corresponds to one valid data stream. A quantity of transport layers, namely, a quantity of layers, is referred to as a "transmission order" or a "transmission rank". The transmission rank may dynamically change. Mapping of a codeword to a layer may be considered as a process of equally dividing the codeword into N pieces and placing each piece into a separate layer. N herein is equal to a quantity of layers to which the codeword needs to be mapped.

Figure 2:
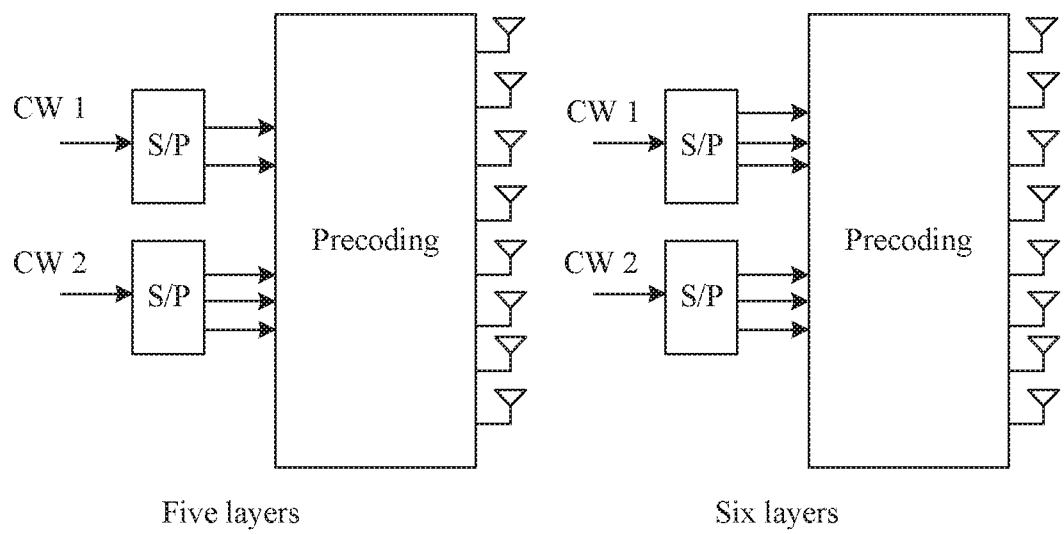
FIG. 2 is a schematic diagram of mapping a codeword to a transport layer and to an antenna port according to an embodiment of this application.
Figure 2:
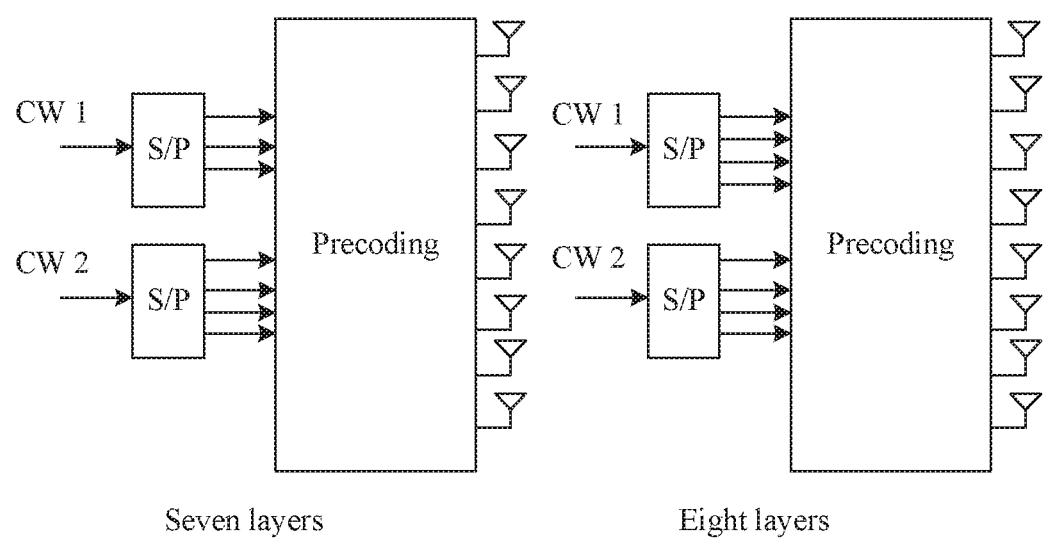

Precoding: Precoding is a process of mapping a transport layer to an antenna port by using a precoding matrix. The precoding matrix is an R×P matrix, where R is a transmission rank, and P is a quantity of antenna ports. FIG. 2 is a schematic diagram of mapping a codeword to a transport layer and to an antenna port.

Figure 3:
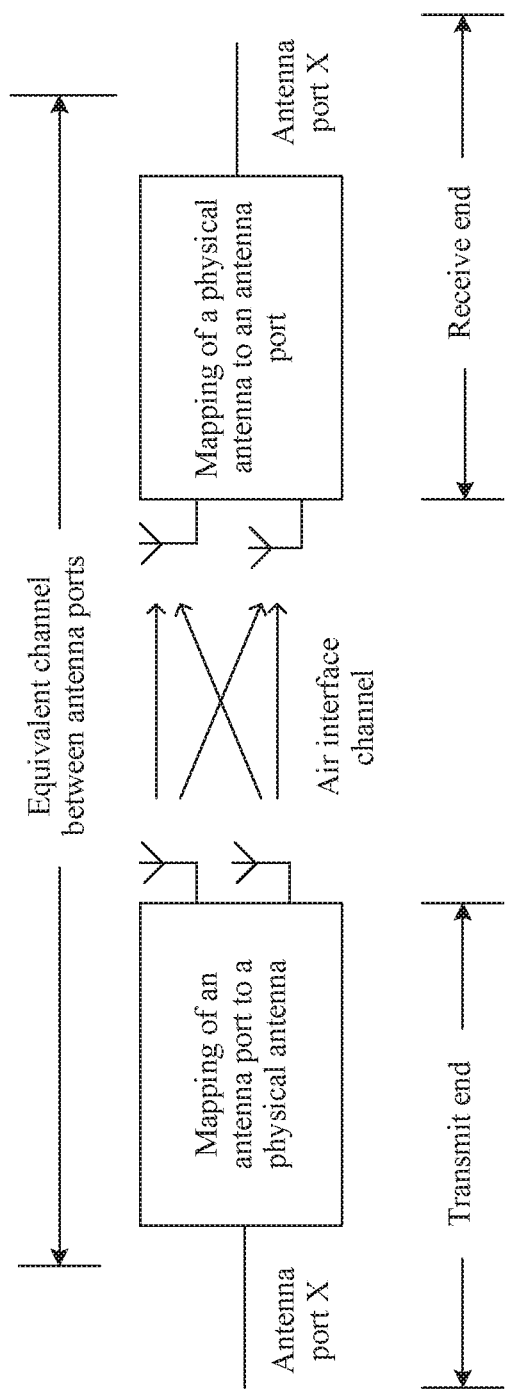
FIG. 3 is a schematic diagram of an equivalent channel between antenna ports according to an embodiment of this application.

Antenna port: It is a logical concept. To be specific, an antenna port may be one physical transmit antenna, or may be a combination of a plurality of physical transmit antennas (in this case, there is a "precoding" between an antenna port and a plurality of physical antennas). However, UE does not distinguish between the two cases. To be specific, a receiver of the UE does not distinguish signals from a same antenna port. This is because from a perspective of the UE, mapping of an antenna port at a transmit end to a physical antenna, an air interface channel between physical antennas from the transmit end to a receive end, and mapping of a physical antenna to an antenna port at the receive end are considered as an equivalent channel, as shown in FIG. 3. The antenna ports of a receive side and a transmit side are the same. To be specific, both a base station and the UE have a same antenna port identifier. For example, the base station sends a layer of data through a port 7. This means that the UE receives the layer of data through the port 7.

A relationship between a TB, a codeword, a transport layer, and an antenna port may be: a quantity of TBs=a quantity of codewords≤a quantity of transmission layers≤a quantity of antenna ports.

The following describes a reference signal RS.

Figure 4:
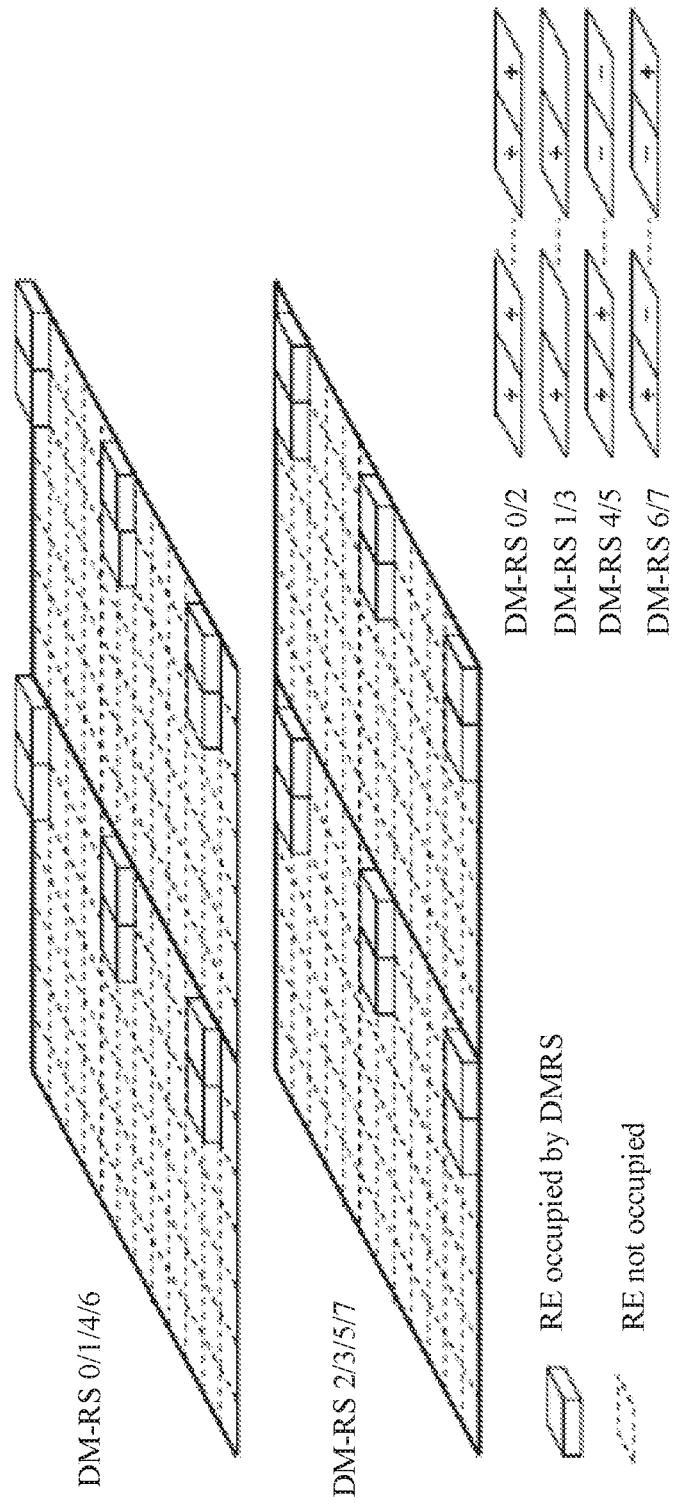
FIG. 4 is a schematic diagram of mapping a maximum of eight UE-specific reference channels in a TM9 to an RE according to an embodiment of this application.

FIG. 4 shows a structure of a UE-specific reference signal that supports transmission of a maximum of eight layers (which correspond to eight antenna ports: ports 7 to 14 in the TM 9 in LTE) in Release 10 in LTE, It can be learned that, each RB pair (including 12 subcarriers×14 time domain symbols) includes 24 REs. Based on different frequency domain locations, eight reference signals may be divided into two groups, and each group includes four reference signals. As shown in FIG. 4, demodulation reference signals (DMRS) 0/1/4/6 (corresponding to antenna ports 7/8/11/13) are in one group, and DMRSs 2/3/5/7 (corresponding to antenna ports 9/10/12/14) are in another group. Reference signals in a same group occupy a same RE resource, and are distinguished from one another by using different orthogonal cover codes (OCC). The OCCs are applied to four REs in a same subframe that have a same frequency domain location (using a same subcarrier) but different time domain locations (different OFDM symbols). Reference signals in different groups occupy different RE resources. Therefore, reference signals in different groups do not interfere with each other.

For a plurality of UEs using the TM 9, if single user multiple-input multiple-output (SU-MIMO) is used, DMRSs corresponding to different UEs are distinguished from one another by using different frequency domain resources (different RBs are allocated to different UEs), and a plurality of DMRSs between different antenna ports of same UE are distinguished from one another by using different frequency domain resources (different subcarriers are used for different groups of antenna ports) and different OCCs (different OCCs are used for a same group of antenna ports). If multi-user multiple-input multiple-output (MU-MIMO) is used (in this case, only antenna ports 7 and 8 can be used), two UEs use a same time-frequency resource, and DMRSs corresponding to different UEs are distinguished from one another by using different combinations of an OCC and a scrambling code $n_{SCID}$. The TM9 can support SU-MIMO transmission of a maximum of eight layers and MU-MIMO transmission of a maximum of four layers.

Figure 5:
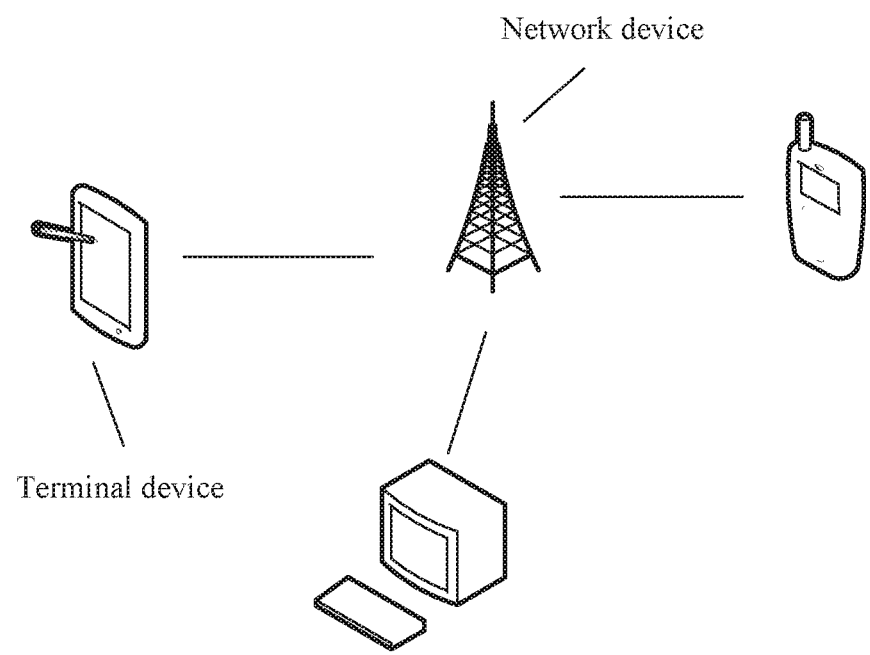
FIG. 5 is a schematic diagram of a network architecture according to an embodiment of this application.

As shown in FIG. 5, a network architecture in this application may include a network device and a terminal device.

The network device may be a base station (BS) device, may also be referred to as a base station, and is an apparatus that is disposed in a radio access network and that is configured to provide a wireless communication function. For example, devices providing a base station function in a 2G network include a base wireless transceiver station (BTS) and a base station controller (BSC); devices providing a base station function in a 3G network include a NodeB and a radio network controller (RNC); a device providing a base station function in a 4G network includes an evolved NodeB (eNB); a device providing a base station function in a wireless local area network (WLAN) is an access point (AP); and devices providing a base station function in a 5G communications system include an eNB, a new radio NodeB (gNB), a centralized unit (CU), a distributed unit, a new radio controller, and the like.

The terminal device may be a movable terminal device, or may be an immovable terminal device. For example, the terminal device may be user equipment (UE). The device is mainly configured to receive or send service data. The user equipment may be distributed in a network. The user equipment has different names in different networks, for example, a terminal, a console, a subscriber unit, a station, a cellular phone, a personal digital assistant, a wireless modem, a wireless communications device, a handheld device, a laptop computer, a cordless phone, and a wireless local loop station. The user equipment may communicate with one or more core networks by using a radio access network (RAN) (an accessed part of a wireless communications network), for example, exchanges voice and/or data with the radio access network.

Figure 6:
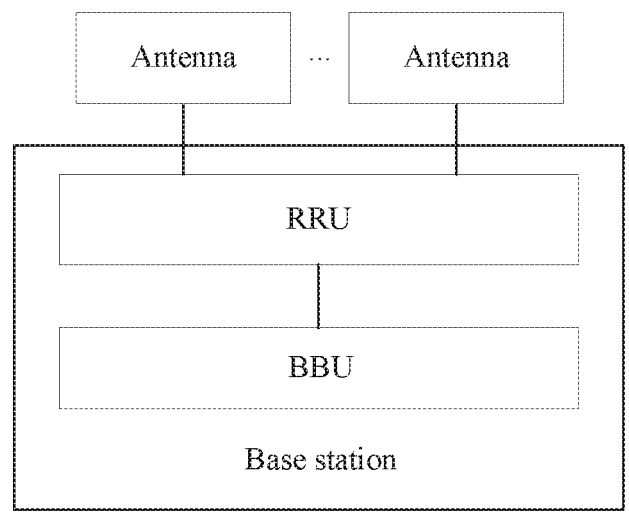
FIG. 6 is a schematic structural diagram of a base station according to an embodiment of this application.

In an example, the base station may be implemented by using a structure shown in FIG. 6. FIG. 6 shows a general hardware architecture of a base station. The base station shown in FIG. 6 may include a building baseband unit (BBU) and a remote radio unit (RRU). The RRU and an antenna feeder system (namely, an antenna) are connected. The BBU and the RRU may be separately used as needed. It should be noted that, in a specific implementation process, the base station 200 may have another general hardware architecture, instead of being limited only to the general hardware architecture shown in FIG. 6. In this embodiment of this application, the RRU may send downlink control information or the like to the terminal device by using the antenna feeder system.

Figure 7:
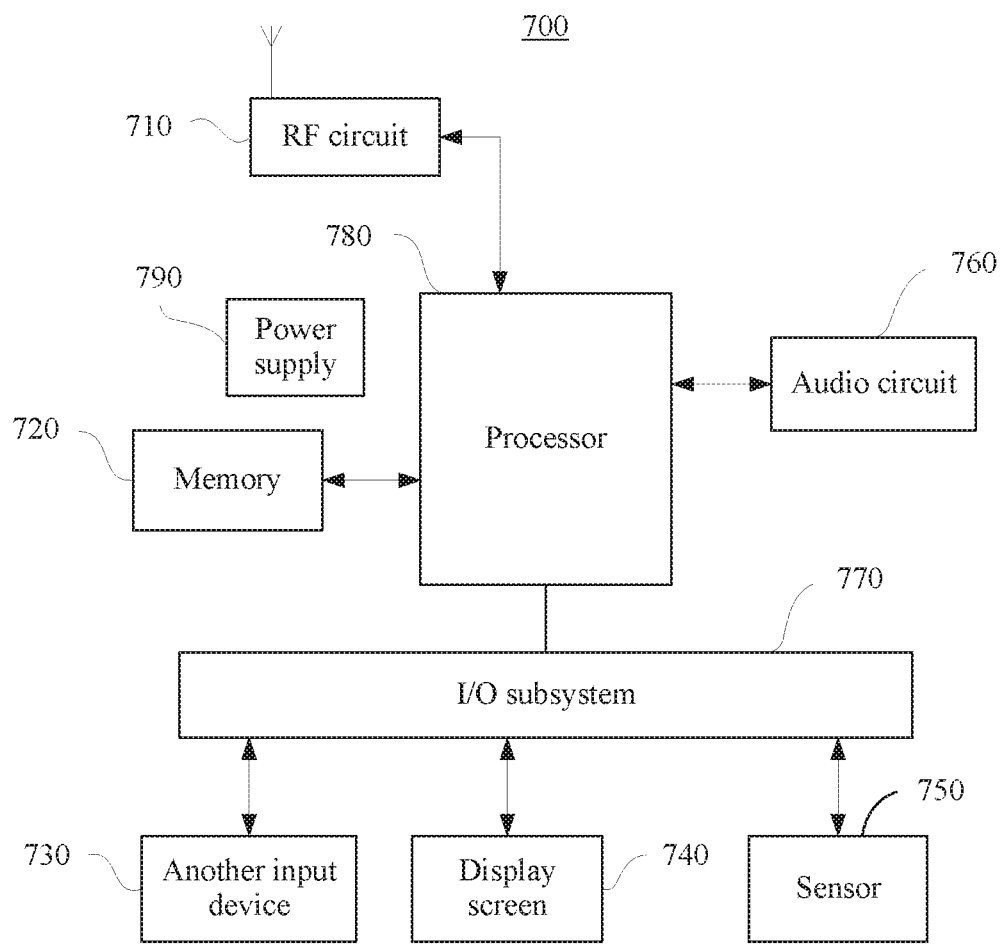
FIG. 7 is a schematic structural diagram of a terminal device according to an embodiment of this application.

In an example, a terminal device 700 may be implemented by using a structure shown in FIG. 7. For example, the terminal device 700 is a mobile phone, and FIG. 7 shows a general hardware architecture of the mobile phone for description. The mobile phone shown in FIG. 7 may include components such as a radio frequency (RF) circuit 710, a memory 720, another input device 730, a display screen 740, a sensor 750, an audio circuit 760, an I/O subsystem 770, a processor 780, and a power supply 790. A person skilled in the art may understand that, a mobile phone structure shown in FIG. 7 does not constitute any limitation on the mobile phone, and the mobile phone may include more or fewer components than those shown in the figure, or some components are combined, or some components are disassembled, or a different component arrangement is used. A person skilled in the art may understand that the display screen 740 belongs to a user interface (UI), and the display screen 740 may include a display panel 741 and a touch panel 742. In addition, the mobile phone may include more or fewer components than those shown in the figure. Although not shown, the mobile phone may further include a function module or device such as a camera or a Bluetooth module. Details are not described herein.

Further, the processor 780 is separately connected to the RF circuit 710, the memory 720, the audio circuit 760, the I/O subsystem 770, and the power supply 790. The input/output (I/O) subsystem 770 is separately connected to the another input device 730, the display screen 740, and the sensor 750. The RF circuit 710 may be configured to receive and send signals during information receiving and sending or in a call process. Particularly, after receiving downlink information of the base station, the RF circuit 710 sends the downlink information to the processor 780 for processing. For example, in this embodiment of this application, the RF circuit 710 is configured to receive downlink control information or the like sent by the base station. The memory 720 may be configured to store a software program and module. By running the software program and module stored in the memory 720, the processor 780 performs various function applications and data processing of the mobile phone. The another input device 730 may be configured to receive input digit or character information, and generate a key signal input related to a user setting and function control of the mobile phone. The display screen 740 may be configured to display information input by a user or information provided for a user and various menus of the mobile phone, and may further receive a user input. The sensor 750 may be an optical sensor, a motion sensor, or another sensor. The audio circuit 760 may provide an audio interface between the user and the mobile phone. The I/O subsystem 770 is configured to control an external input/output device. The external device may include another device input controller, sensor controller, or display controller. The processor 780 is a control center of the mobile phone 700, and connects all parts of the entire mobile phone by using various interfaces and lines. By running or executing a software program and/or a module stored in the memory 720 and invoking data stored in the memory 720, the processor 780 performs various functions and/or data processing of the mobile phone 700, to perform overall monitoring on the mobile phone. The power supply 790 (such as a battery) is configured to supply power to the foregoing components. Preferably, the power supply may be logically connected to the processor 780 by using a power supply management system, thereby implementing functions, such as charging, discharging, and power consumption management, by using the power supply management system.

A basic principle of this application is as follows: In an LTE-evolved system, to reduce sending and receiving latencies, a network device may configure sTTI transmission for a terminal device. In this case, for an existing LTE table, some configurations cannot be applied to an sTTI system. If the existing table is applied to the sTTI system, DCI carries unnecessary information, and the DCI occupies excessive bits. Therefore, in the embodiments of this application, a new table of indication information for a quantity of transmission layers, an antenna port, and a scrambling code ID is designed for the sTTI system to support downlink transmission of a plurality of transport layers. This can reduce bit load in the DCI. Alternatively, in the existing table, another possible configuration manner is used to replace an impossible configuration manner, to increase parameter configuration flexibility of a system, and improve system performance.

The embodiments of this application may be applied to short TTI data transmission between a network device and a terminal device in a wireless communications system. The wireless communications system may be a 4.5G or 5G communications system.

The following describes the embodiments of this application by using an example in which the network device is a base station and the terminal device is UE.

Figure 8:
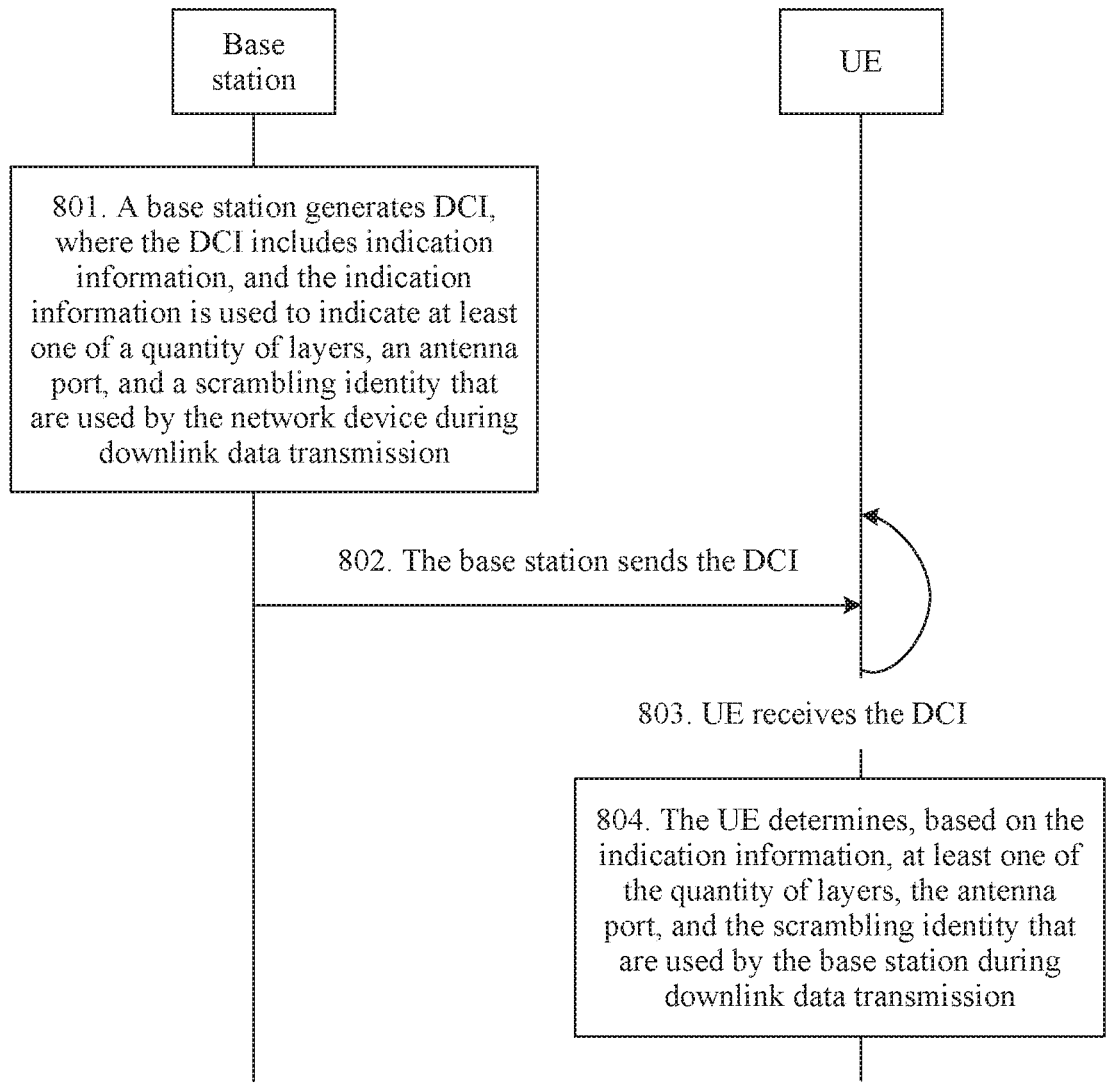
FIG. 8 is a schematic flowchart of a method in which a base station sends downlink control information to UE according to an embodiment of this application.

A method for sending downlink control information to the UE by the base station may be shown in FIG. 8, and includes the following steps.

801. The base station generates DCI, where the DCI includes indication information, and the indication information is used to indicate at least one of a quantity of layers, an antenna port, and a scrambling identity that are used by the network device during downlink data transmission.

A plurality of tables, for example, at least one of Table 1, Table 2, and Table 3, and at least one of Table 4, Table 5, Table 6, and Table 7 mentioned in the following embodiment may be preconfigured in the base station and the UE. Table 4, Table 5, Table 6, and Table 7 are newly configured tables in this application. In schemes including two or three of the following: quantities of layers, antenna ports, and scrambling identities in the newly configured tables, a newly added scheme in this application is included. In other words, a scheme indicated by the indication information in the DCI may be the newly added scheme in this application. The newly configured tables are separately described after step 704 in this embodiment of this application.

802. The base station sends the DCI.

803. The UE receives the DCI.

804. The UE determines, based on the indication information, at least one of the quantity of layers, the antenna port, and the scrambling identity that are used by the base station during downlink data transmission.

The base station may indicate, by using higher layer signaling, a table that the UE should look up. When the UE receives the DCI, the UE may determine, based on the indication information in the DCI, dynamic information that is used by the base station during downlink data transmission and that is indicated by the indication information, where the dynamic information includes at least one of the quantity of layers, the antenna port, and the scrambling identity that are used, so that the UE performs channel estimation on a reference information number during downlink transmission of the base station based on the dynamic information, to demodulate data in uplink and downlink transmission on the antenna port.

Figure 9:
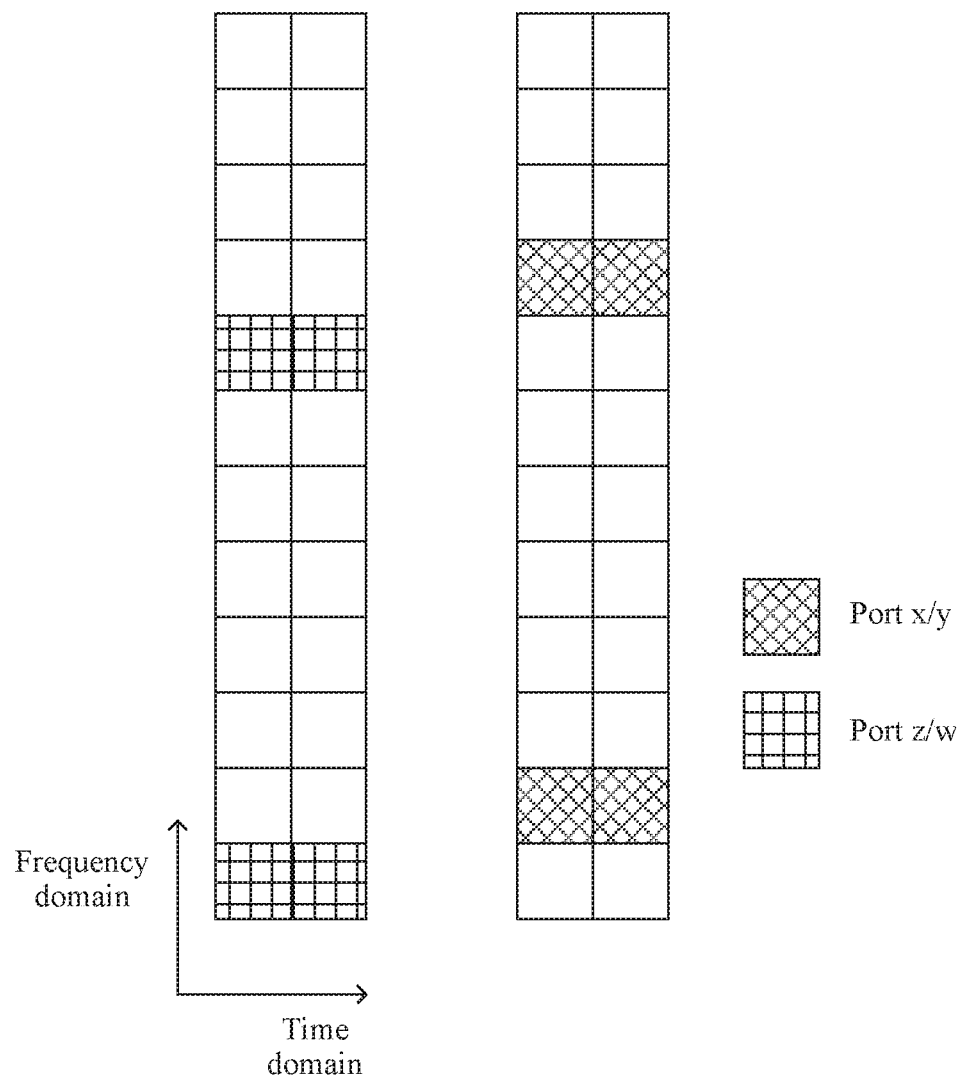
FIG. 9 is a schematic diagram of a possible DMRS resource configuration in an sTTI system with a length of two symbols according to an embodiment of this application.

In an sTTI system with a time length of two symbols, a possible DMRS configuration may be shown in FIG. 9. FIG. 9 indicates a time-frequency grid point included in one RB. The RB occupies two time domain symbols in time domain, and occupies 12 subcarriers in frequency domain. Shaded parts in FIG. 9 show mappings of resources of REs that are used to carry DMRSs and that are allocated by a base station to UE 1 and UE 2 in the RB. Both the UE 1 and the UE 2 use two layers to support spatial multiplexing in one codeword. Different ports are used to distinguish between the UE 1 and the UE 2. In this case, a quantity of time domain symbols changes from 14 in a conventional LTE system to two in the sTTI system. Therefore, in the sill system, an OCC with a length of four REs cannot be supported in time domain. Consequently, a maximum quantity of antenna ports supported in the MI system is four. In this case, in the existing Table 1 and Table 2, configurations related to antenna ports 11 to 14 all become invalid, and the base station cannot schedule the configurations related to the antenna ports 11 to 14 for the UE. In this case, schemes related to the antenna ports 11 to 14 in Table 1 and Table 2 do not need to be configured.

In addition, compared with the conventional LTE system, in the sTTI system, to reduce DMRS overheads, in one RB, DMRS frequency domain density is lower than RMRS frequency domain density in a conventional TTI, and a quantity of DMRSs in frequency domain decreases from three to two. Consequently, a DMRS interference cancellation capability deteriorates. In other words, when the base station schedules a plurality of users at the same time, a quantity of DMRSs decreases, and therefore accuracy of channel estimation performed by the UE by using the DMRSs is reduced, and performance of channel estimation becomes poorer. Further, if the base station simultaneously sends two quasi-orthogonal DMRSs that are carried at a same time, frequency, and antenna port and that are distinguished by using scrambling codes, interference between the two DMRSs is stronger than that in the conventional TTI, leading to poorer downlink data transmission performance. Therefore, in the sTTI system, the base station should try not to use a non-orthogonal multi-user multiplexing mode to schedule the UE. In this case, the base station does not need to distinguish between and multiplex different UEs by using scrambling codes. In this case, for the existing Table 1 and Table 2, when the UE is scheduled without using the non-orthogonal multi-user multiplexing mode, schemes related to $n_{SCID}$ in Table 1 and Table 2 do not need to be configured.

Therefore, for the sTTI system, according to the foregoing descriptions, Table 1 and Table 2 may be abridged after the foregoing descriptions are considered. If each value in Table 1, Table 2, and Table 3 is referred to as indication information, and information in a message corresponding to the value is referred to as a scheme, schemes related to the antenna ports 11 to 14 in Table 1 and Table 2 may be deleted, parameter configurations of $n_{SCID}=0$ and $n_{SCID}=1$ in schemes in Table 1 and Table 2 may be deleted, and schemes related to an OCC being 4 in Table 2 may be deleted, to obtain new tables after the abridgment of Table 1 and Table 2.

The abridgment of Table 1 is used as an example. For the sTTI system, there is only one codeword in downlink data transmission. In this case, after the abridgment, Table 1 may be shown in Table 4.

TABLE 4

3-bit indication information for an antenna port and a quantity of transmission layers

| Indication information (value) | Scheme (message) |
|---|---|
| 0 | 1 layer, port x |
| 1 | 1 layer, port y |
| 2 | 2 layers, ports x, y |
| 3 | 3 layers, ports x, y, z |
| 4 | 4 layers, ports x, y, z, w |
| 5 | Reserved |

In Table 4, x, y, z, and w indicate identifiers of antenna ports. The reason why x, y, z, and w are used to indicate antenna ports in the scheme obtained after the abridgment of the scheme in Table 1 is that identifiers of antenna ports, namely, of identifiers ports, are strictly in a one-to-one correspondence with locations for sending reference signals. In other words, in an existing LTE system, identifiers 7 to 10 of ports imply that DMRSs corresponding to the identifiers of the ports need to be sent in each slot of a subframe, and located on the last two symbols in the slot. In the sTTI system, a DMRS is located in an sTTI. In other words, when the sTTI is not located on the last two symbols in a slot, a DMRS corresponding to the sTTI is definitely not sent on the last two symbols in the slot. Therefore, ports corresponding to the DMRS in the sTTI can no longer be referred to as identifiers 7 to 10 of ports.

When a scheme in Table 1 is reserved, the scheme may be referred to as redundant information. Table 5 shows only one case in which a scheme is reserved when indication information is 5. However, a person skilled in the art may understand that, if schemes related to a scrambling code ID are deleted from schemes indicated by indication information in Table 1, the deleted schemes are reserved. In this case, a plurality of pieces of redundant information are added, and a proportion of indication information for indicating redundant information increases accordingly. It may be understood that, when the UE detects the indication information in the DCI sent by the base station, if an error occurs because the UE mistakes first indication information sent by the base station for second indication information (non-redundant information), the UE cannot correctly receive downlink data corresponding to the first indication information. When the UE detects the indication information in the DCI sent by the base station, if an error occurs because the UE mistakes first indication information sent by the base station for redundant information, the UE recognizes that erroneous detection occurs, and demodulates the first indication information again. Therefore, a higher proportion of redundant information in the indication information indicates a higher possibility that the UE correctly detects the indication information, so that downlink control information DCI transmission reliability is higher.

In a possible implementation, after Table 4 is obtained after the abridgment of Table 1, another possible scheme may be further added to Table 4. When the quantity of layers in Table 4 is 2 layers, the antenna ports are ports x and y. A case in which the antenna ports are another two ports when the quantity of layers is 2 layers may be further added. In this case, the indication information may be used to indicate a new quantity of layers and a corresponding antenna port.

In an example, when there is only one codeword in the downlink data transmission, the indication information indicates a scheme m or a scheme n, the quantity of layers in each of the scheme m and the scheme n may be 2, and the antenna ports in the scheme m and the antenna ports in the scheme n are different.

For example, in Table 5, corresponding schemes when the value is 3 and 4 are newly added schemes.

TABLE 5

3-bit indication information for an antenna port and a quantity of transmission layers

| Value | Message |
|---|---|
| 0 | 1 layer, port x |
| 1 | 1 layer, port y |
| 2 | 2 layers, ports x, y |
| 3 | 2 layers, ports x, z |
| 4 | 2 layers, ports y, w |
| 5 | 3 layers, ports x, y, z |
| 6 | 4 layers, ports x, y, z, w |
| 7 | Reserved |

It should be noted that, an indication range of the indication information in Table 5 includes at least the foregoing seven schemes and a reserved scheme, and may further include another scheme. This is not limited in this application. Referring to Table 5:

in a first scheme, a quantity of layers is 1, and an antenna port is x;

in a second scheme, a quantity of layers is 1, and an antenna port is y;

in a third scheme, a quantity of layers is 2, and antenna ports are x and y;

in a fourth scheme, a quantity of layers is 2, and antenna ports are x and z;

in a fifth scheme, a quantity of layers is 2, and antenna ports are y and w;

in a sixth scheme, a quantity of layers is 3, and antenna ports are x, y, and z; and in a seventh scheme, a quantity of layers is 4, and antenna ports are x, y, z, and w.

When Table 5 is applied, the scheme m may correspondingly include the quantity of layers and the antenna ports in the fourth scheme, and the scheme n may include the quantity of layers and the antenna ports in the fifth scheme.

In other words, when the indication information, namely, the value, in the DCI generated by the base station in step 801 is 3, it indicates that the quantity of layers used by the UE during downlink data transmission is 2, and the antenna ports used by the UE during downlink data transmission are x and z. In this case, in step 804, the UE can determine, based on Table 5 and the indication information in the DCI, the quantity of layers and the antenna ports that are used by the base station during downlink transmission. When the indication information in the DCI is 4, a similar case occurs.

In this way, when the base station and the UE store Table 5 of the newly added schemes, based on the indication by the indication information in the DC1, the base station can more flexibly indicate an antenna port resource to the UE. For example, when the quantity of layers in Table 5 is 2, there may be three optional cases for the antenna port. Because transmission efficiency of the UE during use of each antenna port resource is not exactly the same, the base station can more flexibly indicate an antenna port resource to the UE. In this way, the base station can select an antenna port resource with highest transmission efficiency to serve the UE, thereby improving system transmission efficiency.

In another possible implementation, this application can further abridge Table 4 without adding any new scheme, so that a quantity of bits occupied by the indication information in the DCI decreases, thereby reducing DCI signaling overheads.

In an example, a quantity of bits occupied by the indication information in the DCI may be greater than or equal to 1 and less than 3, the indication information indicates that the quantity of layers is a first quantity of layers or a second quantity of layers, and the first quantity of layers and the second quantity of layers are different. In other words, in the tables stored in the base station and the UE, different schemes may correspond to different quantities of layers, and correspondingly, different quantities of layers correspond to different antenna ports.

For example, if the scheme "1 layer, port 8" in Table 4 is deleted, Table 4 may be updated to Table 6.

TABLE 6

| 2-bit indication information | |
|---|---|
| Value | Message |
| 0 | 1 layer, port x |
| 1 | 2 layers, ports x, y |
| 2 | 3 layers, ports x, y, z |
| 3 | 4 layers, ports x, y, z, w |

It should be noted that, an indication range of the indication information in the DCI may include a maximum of four schemes in Table 6, and include at least two schemes in Table 6. Referring to Table 6:
  in a first scheme, a quantity of layers is 1, and an antenna port is x;
  in a second scheme, a quantity of layers is 2, and antenna ports are x and y;
  in a third scheme, a quantity of layers is 3, and antenna ports are x, y, and z; and
  in a fourth scheme, a quantity of layers is 4, and antenna ports are x, y, z, and w.

When Table 6 is applied, when the first quantity of layers is not equal to the second quantity of layers, the first quantity of layers and the second quantity of layers each may be a quantity of layers in any one of the four schemes. For example, the first quantity of layers is 1, and the second quantity of layers may be 2, 3, or 4.

In addition, compared with the existing Table 1 and Table 2, in Table 6 configured in this application, the indication information in the DCI occupies only two bits, reducing DCI signaling overheads. A quantity of bits for carrying the DCI in a PDCCH is reduced. In this case, more bits in the PDCCH are encoded redundancy bits. A larger quantity of redundancy bits indicates higher DCI transmission reliability.

In the scheme in Table 3, the corresponding quantity of layers is only two. Compared with the existing Table 3, in Table 6 configured in this application, the quantities of layers include one to four. For the base station, the base station can more flexibly indicate, to the UE by using the indication information, a quantity of layers used during data transmission. Because transmission efficiency of the UE during data transmission by using different quantities of layers is not exactly the same, the base station may select a quantity of layers for data transmission with highest transmission efficiency to serve the UE, to improve the system transmission efficiency.

In still another possible implementation, in this application, a table may be further configured for a multi-user scheduling case of the base station and the UE. In the table, a quantity of layers for data transmission can be more flexibly indicated to the UE while different scrambling codes are indicated to a plurality of users, so that the UE can support an MU-MIMO scenario.

In an example, when only one codeword of the UE is in an enabled state, the indication information may indicate a scheme p or a scheme q, the quantity of layers in each of the scheme p and the scheme q is 1, and the scrambling identity in the scheme p and the scrambling identity in the scheme q are different; or the indication information indicates a scheme r or a scheme s, the quantity of layers in each of the scheme r and the scheme s is 2, and the scrambling identity in the scheme r and the scrambling identity in the scheme s are different.

For example, Table 7 is a table configured for multi-user scheduling.

TABLE 7

| 3-bit indication information | |
|---|---|
| Value | Message |
| 0 | 1 layer, port x, $n_{SCID} = 0$ |
| 1 | 1 layer, port x, $n_{SCID} = 1$ |
| 2 | 1 layer, port y, $n_{SCID} = 0$ |
| 3 | 1 layer, port y, $n_{SCID} = 1$ |
| 4 | 2 layers, port x, y, $n_{SCID} = 0$ |
| 5 | 2 layers, port x, y, $n_{SCID} = 1$ |
| 6 | 3 layers, port x, y, z |
| 7 | 4 layers, port x, y, z, w |

It should be noted that, an indication range of the indication information in Table 7 includes at least the foregoing eight schemes, and may further include another scheme. This is not limited in this application. Referring to Table 7:
  in a first scheme, a quantity of layers is 1, an antenna port is x, and a scrambling identity is 0;
  in a second scheme, a quantity of layers is 1, an antenna port is x, and a scrambling identity is 1;
  in a third scheme, a quantity of layers is 1, an antenna port is y, and a scrambling identity is 0:
  in a fourth scheme, quantity of layers is 1, an antenna port is y, and a scrambling identity is 1;
  in a fifth scheme, a quantity of layers is 2, antenna ports are x and y, and a scrambling identity is 0;
  in a sixth scheme, a quantity of layers is 2, antenna ports are x and y, and a scrambling identity is 1;
  in a seventh scheme, a quantity of layers is 3, and antenna ports are x, y, and z; and
  in an eighth scheme, a quantity of layers is 4, and antenna ports are x, y, z, and w.

When Table 7 is applied, the scheme p may include the quantity of layers, the antenna port, and the scrambling identity in the first scheme, and the scheme q may include the quantity of layers, the antenna port, and the scrambling identity in the second scheme or the fourth scheme.

Alternatively, the scheme p may include the quantity of layers, the antenna port, and the scrambling identity in the second scheme, and the scheme q may include the quantity of layers, the antenna port, and the scrambling identity in the first scheme or the third scheme.

The scheme r may include the quantity of layers, the antenna ports, and the scrambling identity in the fifth scheme, and the scheme s includes the quantity of layers, the antenna ports, and the scrambling identity in the sixth scheme.

The scheme p and the scheme s are used as an example. When the base station performs multi-user scheduling, if a value of indication information sent by the base station to UE 1 is 0, it indicates that a quantity of layers used by the UE 1 during downlink data transmission is 1, an antenna port used by the UE 1 during downlink data transmission is x, and a scrambling identity used by the UE 1 during downlink data transmission is 0; and if a value of indication information sent by the base station to UE 2 is 5, it indicates that a quantity of layers used by the UE 2 during downlink data transmission is 2, antenna ports used by the UE 2 during downlink data transmission are x and y, and a scrambling identity used by the UE 2 during downlink data transmission is 1. In this case, when the base station performs multi-user scheduling, quantities of layers for data transmission that are indicated to the UE 1 and the UE 2 may be different while different scrambling identities are indicated to the UE 1 and the UE 2. Because transmission efficiency of a UE during data transmission at different quantities of layers is not exactly the same, the base station can more flexibly indicate a quantity of layers for data transmission. In this case, the base station may select a quantity of layers for data transmission with highest transmission efficiency to serve a UE, to improve system transmission efficiency.

It should be noted that, in Table 4, Table 5, Table 6, and Table 7, RSs corresponding to the antenna port x and the antenna port y are carried on a same group of REs, and the two ports are distinguished from each other by using different orthogonal superposition codes. RSs corresponding to the antenna port z and the antenna port w are carried on a same group of REs, and the two ports are distinguished from each other by using different orthogonal cover codes.

Distinguishing between antenna ports in this manner has the following advantages. On one hand, when the base station expects to schedule only one user on a time-frequency resource and perform transmission by using two layers, the antenna ports x and y (for example, the value 2 in Table 4) may be allocated by the base station. In this case, REs carrying RSs of the antenna ports z and w may be released for transmitting data of the user, thereby improving resource utilization efficiency.

On the other hand, when the base station expects to schedule two users on a time-frequency resource, each user performs transmission by using two layers, and the two users are distinguished from each other by using different antenna ports, the base station allocates the antenna ports x and z to a user, and allocates the antenna ports y and w to the other user (for example, the values 3 and 4 in Table 5). In this way, each user learns, without needing an additional signaling notification, that all REs carrying RSs of the antenna ports x, y, z, and w are occupied by the RSs, in other words, downlink data that needs to be received is not to be sent on these REs. In such a scheme, physical signaling is reduced, or downlink control information overheads are reduced.

In a possible design, in Table 4, Table 5, Table 6, and Table 7, a value of x may be 107, a value of y may be 108, a value of z may be 109, and a value of w may be 110.

According to the foregoing descriptions, a newly configured table in this application is stored in the network device and the terminal device. The newly configured table includes a newly added scheme. Compared with an existing table, for an sTTI system, the newly configured table in this application is more flexible, and can improve DCI transmission reliability and system transmission efficiency.

In addition, the base station may further indicate, to specific UE by using the DCI, a frequency resource used during downlink transmission. There are three manners in total of indicating a frequency resource by the base station. The three manners are referred to as a type 0, a type 1, and a type 2. In the type 2, the base station may indicate a plurality of consecutive virtual resource blocks (VRB) or physical resource blocks (PRB) to a user. In resource allocation of this type, a resource allocated by the base station to the UE is indicated by using a resource indicator value (REV). The UE may deduce, by using the RIV, a start RB (denoted by $RB_{start}$) of a frequency resource allocated by the base station to the UE and a length (denoted by M) of allocated consecutive VRBs or PRBs. A calculation formula is as follows:

If M is less than or equal to $\lfloor N/2 \rfloor+1$, $RIV=N(M-1)+RB_{start}$; otherwise, $RIV=N(-M+1)+N-1-RB_{start}$, where N is a maximum quantity of PRBs or VRBs that can be used in system downlink transmission.

In the sTTI system, each sTTI becomes shorter because of a time domain resource. Therefore, to ensure that an amount of data that can be carried is not reduced in proportion with a time domain length of an sTTI, a frequency domain resource allocated by the base station to the user increases. Consequently, the resource indication type 2 also needs to be correspondingly modified. Specifically, the type 2 no longer indicates a plurality of consecutive VRBs or PRBs, but indicates a plurality of consecutive resource block groups (RBG). The original RIV calculation formula needs to be redesigned due to such a modification.

Figure 10:
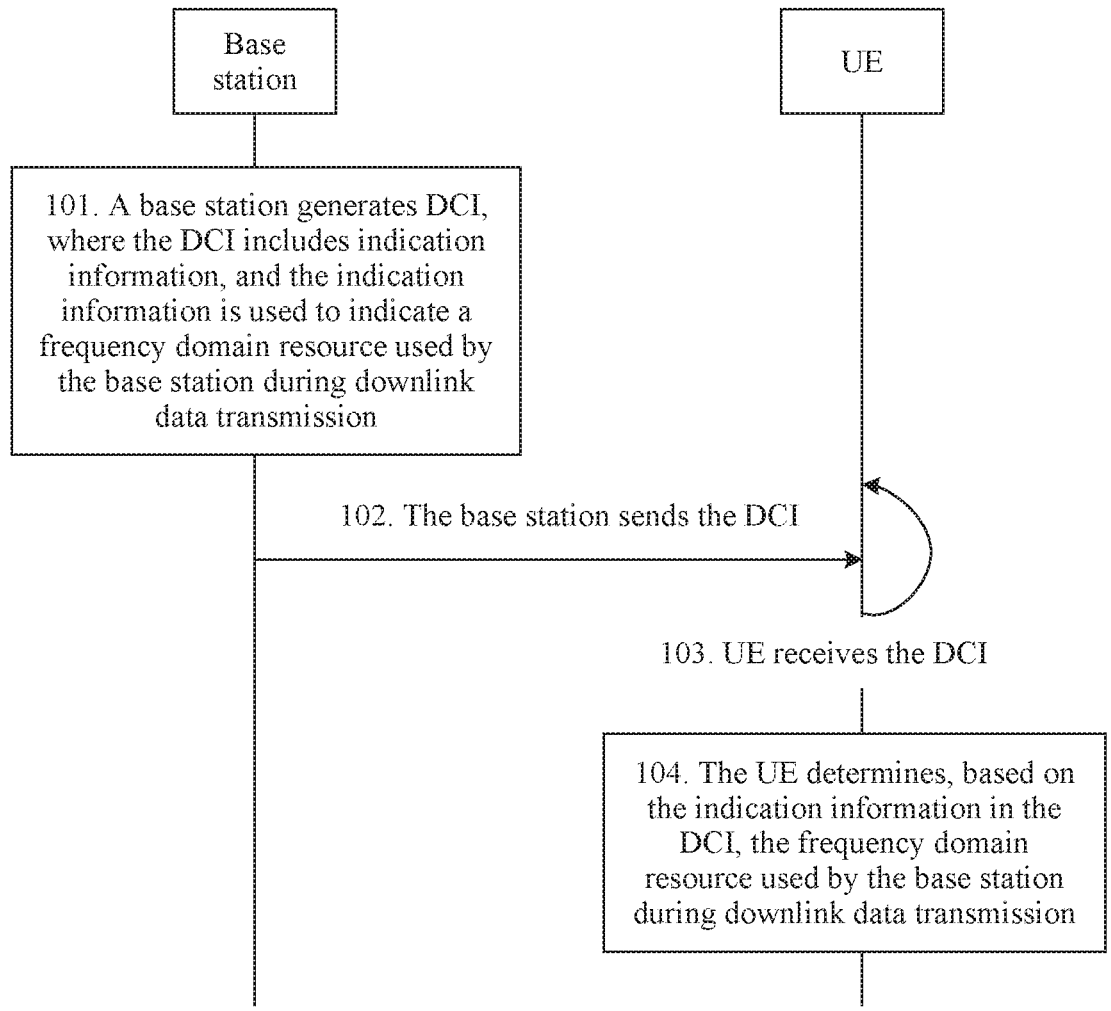
FIG. 10 is a schematic flowchart of a method in which a base station sends downlink control information to UE according to an embodiment of this application.

Therefore, an embodiment of this application further provides a method for sending downlink control information, and the method may be applied to an sTTI system. That a network device is a base station and a terminal device is UE is used as an example. As shown in FIG. 10, the method includes the following steps.

101. The base station generates DCI, where the DCI includes indication information, and the indication information is used to indicate a frequency domain resource used by the base station during downlink data transmission.

The indication information and a manner of calculating the frequency domain resource used by the base station exist in both the network device and the terminal device. When the base station determines a frequency domain resource to be used during downlink data transmission to be performed with the UE, the base station generates DCI, where the DCI carries indication information, and the indication information is bit information of an RIV. The UE determines, based on the indication information, the frequency domain resource used by the base station during downlink data transmission.

A relationship between the REV and the frequency domain resource, namely, the calculation formula, is a newly configured formula in this application. To be specific, the base station obtains the RIV based on the new calculation manner, and the UE also deduces the frequency domain resource based on the new calculation manner. The calculation manner is to be described after step 104.

102. The base station sends the DCI.
103. The UE receives the DCI.
104. The UE determines, based on the indication information in the DCI, the frequency domain resource used by the base station during downlink data transmission.

After determining the frequency domain resource used by the base station during downlink data transmission, the UE can receive, on the frequency domain resource, downlink data sent by the base station.

To adapt to the sTTI system, for a relationship between the indication information and the frequency domain resource, in a possible implementation, the indication information corresponding to the RIV may be 6-bit information, an indication range of the indication information includes 64 schemes, a value range of the WV is 0 to 63, and a scheme corresponding to each RIV includes a start VRB or PRB index of a frequency resource allocated by the base station to the UE and a quantity of consecutive SRBGs. It is assumed that the frequency domain resource allocated by the base station to the UE includes m+1 short resource block groups (SRBG). Each SRBG includes four or five VRBs or PRBs. A VRB or PRB index corresponding to a start location of the frequency domain resource is 2n. In this case, the base station may obtain a value of the RIV by using a calculation formula: 11m+n (where m is greater than or equal to 0 and less than or equal to 5, n is greater than or equal to 0 and less than or equal to 10, and when m is equal to 5, n is not equal to 9 and 10). Indication information corresponding to the value of the RN indicates that the frequency domain resource used by the base station during downlink data transmission is m+1 SRBGs, and the VRB or PRB index corresponding to the start location is 2*n.

According to the foregoing descriptions, in an example, the calculation formula of the RIV may be as follows:

$$RIV=11*(L-1)+RB_{start}/2,$$

where $RB_{start}$ is an index of the start VRB or the start of PRB of the frequency resource allocated by the base station to the UE, the index is equal to 2*n, L is the quantity of allocated consecutive SRBGs, and L=m+1.

When the UE receives the indication information sent by the base station, the UE may deduce, based on the value that is of the RIV and that is indicated by the indication information, the frequency domain resource L used by the base station during downlink data transmission, and the VRB or PRB index $RB_{start}$ corresponding to the start location. The UE may obtain a value of L and a value of 2*n by using the value in of RIV/11 and a remainder n, in other words, obtain the quantity of the allocated consecutive SRBGs and the start VRB or PRB index.

In another possible design, the indication information may be 6-bit information, an indication range of the indication information includes 64 schemes, a value range of the RIV is 0 to 63, and a scheme corresponding to each RIV includes a start VRB or PRB index of a frequency resource allocated by the base station to the UE and a quantity of consecutive SRBGs. It is assumed that the frequency domain resource allocated by the base station to the UE includes n+1 SRBGs. Each SRBG includes four or five VRBs or PRBs. A VRB or PRB index corresponding to a start location of the frequency domain resource is 2*m. In this case, the base station may obtain a value of the RIV by using a calculation formula: 6m+n (where m is greater than or equal to 0 and less than or equal to 10, n is greater than or equal to 0 and less than or equal to 5, and when m is equal to 10, n is not equal to 4 and 5). Indication information corresponding to the value of the RIV indicates that the frequency domain resource used by the base station during downlink data transmission is n+1 SRBGs, and the VRB or PRB index corresponding to the start location is 2*m.

According to the foregoing descriptions, in an example, the calculation formula of the RIV may be as follows:

$$RIV=3*RB_{start}+L-1,$$

where $RB_{start}$ is an index of the start VRB or the start PRB of the frequency resource allocated by the base station to the UE, the index is equal to 2*n, L is the quantity of allocated consecutive SRBGs, and L=n+1.

When the UE receives the indication information sent by the base station, the UE may deduce, based on the value that is of the RIV and that is indicated by the indication information, the frequency domain resource L used by the base station during downlink data transmission, and the VRB or PRB index $RB_{start}$ corresponding to the start location. The UE may obtain a value of L and a value of 2*m by using the value in of RIV/6 and a remainder n, in other words, obtain the quantity of the allocated consecutive SRBGs and the start VRB or PRB index. In this way, in the sTTI system, when frequency domain resources allocated by the base station to a user increase, and the type 2 indicates a plurality of consecutive RBGs, the foregoing calculation manner may be used to allocate frequency domain resources to the user by the base station, to improve DCI flexibility and reliability.

Because precoding is a layer-to-antenna port mapping, when one layer is mapped to a plurality of antenna ports, the precoding may be a vector, and when a plurality of layers are mapped to more antenna ports, the precoding may be a matrix. When performing channel estimation based on a common reference signal (CRS), the user can only estimate an original channel based on the CRS. In this case, the UE needs to know precoding of the base station before learning all transformations performed on data during downlink transmission, and performs inverse transformations one by one to obtain original data.

Therefore, the indication information included in the DCI may further include a precoding indicator (bit field mapped to index in the following table). The precoding indicator is used by the base station to indicate, to specific UE, precoding used during downlink transmission. The precoding may be a precoding vector or a precoding matrix depending on a quantity of transmission layers. After receiving the precoding indicator, the user determines, based on a quantity of enabled codewords in current downlink transmission and a predefined table, the precoding used by the base station during downlink transmission. In an existing LTE system, for UE with two antenna ports, if the base station enables one codeword, only a two-layer transmit diversity, or precoding-based one-layer transmission can be used; or if the base station enables two codewords, only two-layer transmission can be used, as shown in Table 8.

TABLE 8

| One codeword enabled | | Two codewords enabled | |
|---|---|---|---|
| Bit field mapped to index | Message | Bit field mapped to index | Message |
| 0 | 2 layers: Transmit diversity | 0 | 2 layers: Precoding matrix $\frac{1}{2}\begin{bmatrix} 1 & 1 \\ 1 & -1 \end{bmatrix}$ |
| 1 | 1 layer: Precoding vector $[1\ 1]^T/\sqrt{2}$ | 1 | 2 layers: Precoding matrix $\frac{1}{2}\begin{bmatrix} 1 & 1 \\ j & -j \end{bmatrix}$ |
| 2 | 1 layer: Precoding vector $[1\ -1]^T/\sqrt{2}$ | 2 | 2 layers: Precoding reported by a latest PMI carried on a PUSCH is used as a precoding matrix. |
| 3 | 1 layer: Precoding vector $[1\ j]^T/\sqrt{2}$ | 3-7 | Reserved |
| 4 | 1 layer: Precoding vector $[1\ -j]^T/\sqrt{2}$ | | |
| 5 | 1 layer: Precoding reported by a latest PMI carried on a PUSCH is used as a precoding vector, and if a reported RI = 2, $\sqrt{2}$ multiplied by the first column of a precoding matrix indicated by the PMI is used as precoding. | | |
| 6 | 1 layer: Precoding reported by a latest PMI carried on a PUSCH is used as a precoding vector, and if a reported RI = 2, $\sqrt{2}$ multiplied by the second column of a precoding matrix indicated by the PMI is used as precoding. | | |
| 7 | Reserved | | |

For UE with four antenna ports, if the base station enables one codeword, only a four-layer transmit diversity, or precoding-based one-layer/two-layer transmission can be used. If the base station enables two codewords, only three-layer/four-layer transmission can be used, as shown in Table 9.

TABLE 9

| One codeword enabled | | Two codewords enabled | |
|---|---|---|---|
| Bit field mapped to index | Message | Bit field mapped to index | Message |
| 0 | 4 layers: Transmit diversity | 0 | 2 layers: TPMI = 0 |
| 1 | 1 layer: TPMI = 0 | 1 | 2 layers: TPMI = 1 |
| 2 | 1 layer: TPMI = 1 | . | . |
| . | . | . | . |
| . | . | . | . |
| . | . | 15 | 2 layers: TPMI = 15 |
| 16 | 1 layer: TPMI = 15 | 16 | 2 layers: Precoding reported by a latest PMI carried on a PUSCH is used as precoding. |
| 17 | 1 layer: Precoding reported by a latest PMI carried on a PUSCH is used as precoding. | 17 | 3 layers: TPMI = 0 |
| 18 | 2 layers: TPMI = 0 | 18 | 3 layers: TPMI = 1 |
| 19 | 2 layers: TPMI = 1 | . | . |
| . | . | . | . |
| . | . | 32 | 3 layers: TPMI = 15 |
| . | . | | |
| 33 | 2 layers: TPMI = 15 | 33 | 3 layers: Precoding reported by a latest PMI carried on a PUSCH is used as precoding. |
| 34 | 2 layers: Precoding reported by a latest PMI carried on a PUSCH is used as precoding. | 34 | 4 layers: TPMI = 0 |
| 35-63 | Reserved | 35 | 4 layers: TPMI = 1 |
| | | . | . |
| | | 49 | 4 layers: TPMI = 15 |
| | | 50 | 4 layers: Precoding reported by a latest PMI carried on a PUSCH is used as precoding |
| | | 51-63 | Reserved |

Precoding used by M layers, TPMI=N (where M is greater than or equal to 1 and less than or equal to 4, and N is greater than or equal to 0 and less than or equal to 15) is calculated based on Table 10.

TABLE 10

Antenna port codebook

| Codebook index (N) | $u_n$ | Number of layers (M) | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |

TABLE 10-continued

Antenna port codebook

| Codebook index (N) | $u_n$ | Number of layers (M) | | | |
|---|---|---|---|---|---|
| | | 1 | 2 | 3 | 4 |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

$W_n = 1 - 2u_n u_n^H / u_n^H u_n$, and $W_n^{\{s\}}$ is an $s^{th}$ column of a matrix $W_n$.

Figure 10A:
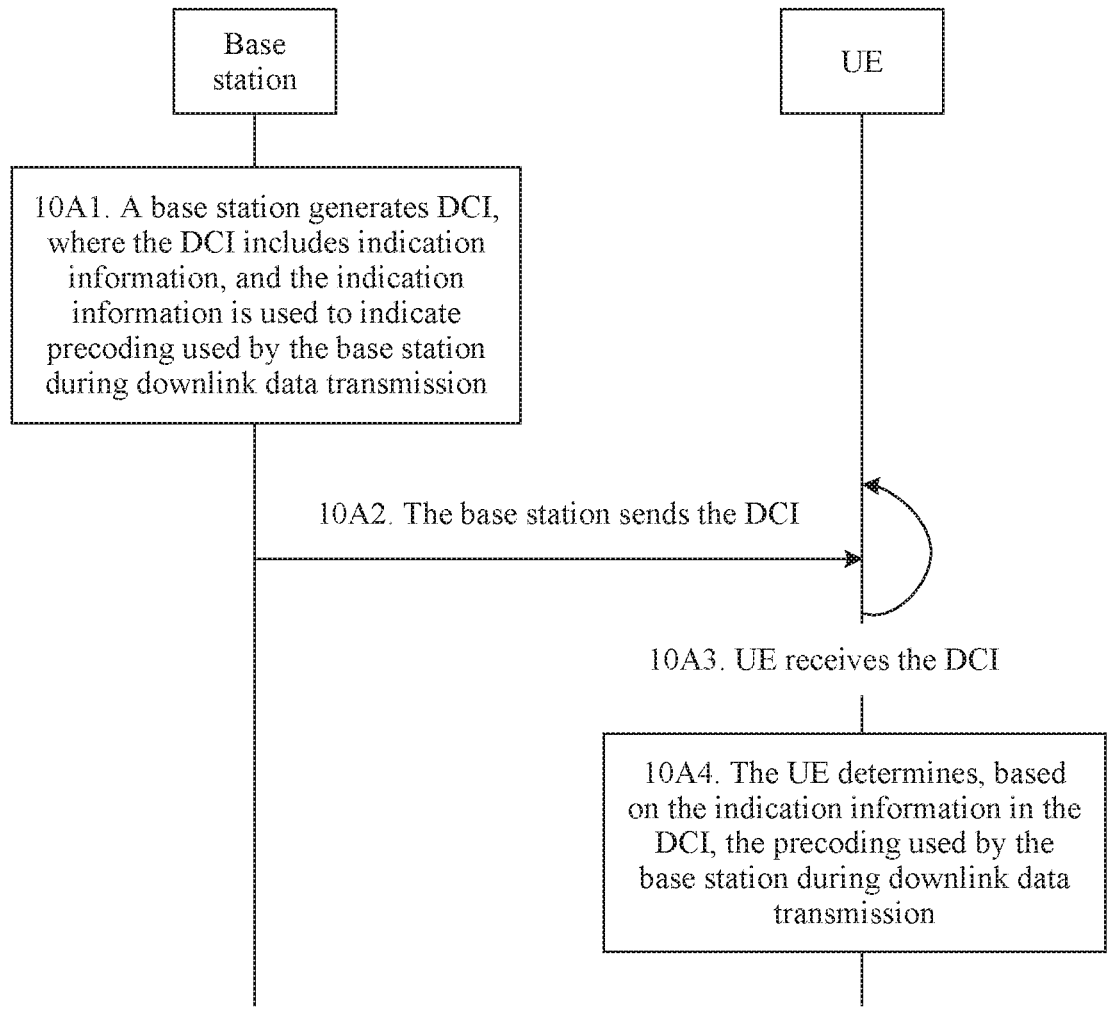
FIG. 10A is a schematic flowchart of a method in which a base station sends downlink control information to UE according to an embodiment of this application.

In downlink transmission of the sTTI system, enabling of only one codeword is allowed, but a maximum quantity of layers that can be used is the same as a quantity of antenna ports. Therefore, in Table 8 and Table 9, when two codewords are enabled, a correspondence between a precoding indicator and a message is not to be used. Therefore, in the sTTI system, an original precoding table needs to be redesigned due to such a modification of the codeword. Therefore, an embodiment of this application further provides a method for sending downlink control information, and the method may be applied to an sTTI system. That a network device is a base station and a terminal device is UE is used as an example. As shown in FIG. 10A, the method includes the following steps.

10A1. The base station generates DCI, where the DCI includes indication information, and the indication information is used to indicate precoding used by the base station during downlink data transmission.

The indication information may also be referred to as a precoding indicator. A predefined table of a correspondence between the indication information and the used precoding exists in both the network device and the terminal device. When the base station determines the precoding to be used during downlink data transmission to be performed with the UE, the base station generates DCI, where the DCI carries indication information, and the UE determines, based on the indication information, the precoding used by the base station during downlink data transmission.

A relationship between the precoding and the indication information is to be described after step 10A4.

10A2. The base station sends the DCI.

10A3. The UE receives the DCI.

10A4. The UE determines, based on the indication information in the DCI, the precoding used by the base station during downlink data transmission.

After determining the precoding used by the base station during downlink data transmission, and receiving downlink data, the UE can demodulate, based on the precoding, data in the downlink transmission.

In an example, when there is only one codeword in downlink data transmission, a predefined table of a correspondence between indication information of a UE that supports transmission of a maximum of two antenna ports and used precoding may be shown in Table 11.

TABLE 11

| Bit field mapped to index | Message |
|---|---|
| 0 | 2 layers: Transmit diversity |
| 1 | 1 layer: Precoding vector $[1\ \ 1]^T/\sqrt{2}$ |
| 2 | 1 layer: Precoding vector $[1\ -1]^T/\sqrt{2}$ |
| 3 | 1 layer: Precoding vector $[1\ \ j]^T/\sqrt{2}$ |
| 4 | 1 layer: Precoding vector $[1\ -j]^T/\sqrt{2}$ |

TABLE 11-continued

| Bit field mapped to index | Message |
|---|---|
| 5 | 1 layer: Precoding reported by a latest PMI carried on a PUSCH is used as a precoding vector, and if a reported RI = 2, $\sqrt{2}$ multiplied by the first column of a precoding matrix indicated by the PMI is used as precoding. |
| 6 | 1 layer: Precoding reported by a latest PMI carried on a PUSCH is used as a precoding vector, and if a reported RI = 2, $\sqrt{2}$ multiplied by the second column of a precoding matrix indicated by the PMI is used as precoding. |
| 7 | 2 layers: Precoding matrix $\frac{1}{2}\begin{bmatrix} 1 & 1 \\ 1 & -1 \end{bmatrix}$ |
| 8 | 2 layers: Precoding matrix $\frac{1}{2}\begin{bmatrix} 1 & 1 \\ j & -j \end{bmatrix}$ |
| 9 | 2 layers: Precoding reported by a latest PMI carried on a PUSCH is used as a precoding matrix. |

It should be noted that, an indication range of the indication information in Table 11 includes at least the foregoing 10 schemes, and may further include another scheme. This is not limited in this application. Referring to Table 11:

in a first scheme, a precoding scheme is a two-layer transmit diversity;

in a second scheme, a precoding scheme is one-layer transmission, and a precoding vector $[1\ 1]^T/\sqrt{2}$ is used;

in a third scheme, a precoding scheme is one-layer transmission, and a precoding vector $[1\ -1]^T/\sqrt{2}$ is used;

in a fourth scheme, a precoding scheme is one-layer transmission, and a precoding vector $[1\ j]^T/\sqrt{2}$ is used;

in a fifth scheme, a precoding scheme is one-layer transmission, and a precoding vector $[1\ -j]^T/\sqrt{2}$ is used;

in a sixth scheme, a precoding scheme is one-layer transmission, a used precoding vector is precoding reported by a latest precoding matrix indicator (PMI) carried on a PUSCH, and if a reported rank indication (RI)=2, $\sqrt{2}$ multiplied by the first column of a precoding matrix indicated by the PMI is used as precoding;

in a seventh scheme, a precoding scheme is one-layer transmission, a used precoding vector is precoding reported by a latest PMI carried on a PUSCH, and if a reported RI=2, $\sqrt{2}$ multiplied by the second column of a precoding matrix indicated by the PMI is used as precoding;

in an eighth scheme, a precoding scheme is two-layer transmission, and a precoding matrix $$\frac{1}{2}\begin{bmatrix} 1 & 1 \\ 1 & -1 \end{bmatrix}$$

is used;

in a ninth scheme, a precoding scheme is two-layer transmission, and a precoding matrix $$\frac{1}{2}\begin{bmatrix} 1 & 1 \\ j & -j \end{bmatrix}$$

is used; and in a tenth scheme, a precoding scheme is two-layer transmission, and a used precoding vector is precoding reported by a latest PMI carried on a PUSCH.

Table 11 actually merges two columns in Table 8 into one column without deletion. Advantages of the scheme are as follows: When the base station can schedule only one codeword for the UE, the base station can still use two-layer precoding to serve the UE, without reducing precoding selection flexibility, and system transmission efficiency can be maintained.

In an example, when there is only one codeword in downlink data transmission, a predefined table of a correspondence between indication information of a UE that supports transmission of a maximum of two antenna ports and used precoding may alternatively be shown in Table 12.

TABLE 12

| Bit field mapped to index | Message |
|---|---|
| 0 | 2 layers: Transmit diversity |
| 1 | 1 layer: Precoding vector $[1\ \ 1]^T/\sqrt{2}$ |
| 2 | 1 layer: Precoding vector $[1\ \ -1]^T/\sqrt{2}$ |
| 3 | 1 layer: Precoding vector $[1\ \ j]^T/\sqrt{2}$ |
| 4 | 1 layer: Precoding vector $[1\ \ -j]^T/\sqrt{2}$ |
| 5 | 2 layers: Precoding matrix $\frac{1}{2}\begin{bmatrix} 1 & 1 \\ 1 & -1 \end{bmatrix}$ |
| 6 | 2 layers: Precoding matrix $\frac{1}{2}\begin{bmatrix} 1 & 1 \\ j & -j \end{bmatrix}$ |
| 7 | 2 layers: Precoding reported by a latest PMI carried on a PUSCH is used as a precoding matrix. |

It should be noted that, an indication range of the indication information in Table 12 includes at least the foregoing eight schemes, and may further include another scheme. This is not limited in this application. Referring to Table 12:

in a first scheme, a precoding scheme is a two-layer transmit diversity; in a second scheme, a precoding scheme is one-layer transmission, and a precoding vector $[1\ 1]^T/\sqrt{2}$ is used;

in a third scheme, a precoding scheme is one-layer transmission, and a precoding vector $[1-1]^T/\sqrt{2}$ is used;

in a fourth scheme, a precoding scheme is one-layer transmission, and a precoding vector $[1\ j]^T/\sqrt{2}$ is used;

in a fifth scheme, a precoding scheme is one-layer transmission, and a precoding vector $[1-j]^T/\sqrt{2}$ is used;

in a sixth scheme, a precoding scheme is two-layer transmission, and a precoding matrix $$\frac{1}{2}\begin{bmatrix} 1 & 1 \\ 1 & -1 \end{bmatrix}$$

is used;

in a seventh scheme, a precoding scheme is two-layer transmission, and a precoding matrix $$\frac{1}{2}\begin{bmatrix} 1 & 1 \\ j & -j \end{bmatrix}$$

is used; and in an eighth scheme, a precoding scheme is two-layer transmission, and a used precoding vector is precoding reported by a latest PMI carried on a PUSCH.

Table 12 actually merges two columns in Table 8 into one column, and to maintain the indication information to be 3 bits, three original schemes of determining precoding based on a reported PMI are merged into one. Advantages of the scheme are as follows: When the base station can schedule only one codeword for the UE, the base station can still use two-layer precoding to serve the UE, without reducing precoding selection flexibility, and system transmission efficiency can be maintained while DCI overheads remain unchanged.

In an example, when there is only one codeword in downlink data transmission, a predefined table of a correspondence between indication information of a UE that supports transmission of a maximum of four antenna ports and used precoding may be shown in Table 13.

TABLE 13

| Bit field mapped to index | Message |
|---|---|
| 0 | 4 layers: Transmit diversity |
| 1 | 1 layer: TPMI = 0 |
| 2 | 1 layer: TPMI = 1 |
| . | . |
| . | . |
| . | . |
| 16 | 1 layer: TPMI = 15 |
| 17 | 1 layer: Precoding reported by a latest PMI carried on a PUSCH is used as a precoding matrix. |
| 18 | 2 layers: TPMI = 0 |
| 19 | 2 layers: TPMI = 1 |
| . | . |
| . | . |
| . | . |
| 33 | 2 layers: TPMI = 15 |
| 34 | 2 layers: Precoding reported by a latest PMI carried on a PUSCH is used as a precoding matrix. |
| 35 | 3 layers: TPMI = 0 |
| 36 | 3 layers: TPMI = 1 |
| . | . |
| . | . |
| . | . |
| 50 | 3 layers: TPMI = 15 |

TABLE 13-continued

| Bit field mapped to index | Message |
| --- | --- |
| 51 | 3 layers: Precoding reported by a latest PMI carried on a PUSCH is used as a precoding matrix. |
| 52 | 4 layers: TPMI = 0 |
| 53 | 4 layers: TPMI = 1 |
| . | . |
| . | . |
| . | . |
| 67 | 4 layers: TPMI = 15 |
| 68 | 4 layers: Precoding reported by a latest PMI carried on a PUSCH is used as a precoding matrix. |

It should be noted that, an indication range of the indication information in Table 13 includes at least the foregoing 69 schemes, and may further include another scheme. This is not limited in this application. Referring to Table 13:

in a first scheme, a precoding scheme is a four-layer transmit diversity;

in a second to a seventeenth schemes, a precoding scheme is one-layer transmission, and a used precoding vector is predefined TPMIs 0 to 15;

in an eighteenth scheme, a precoding scheme is one-layer transmission, and a used precoding vector is precoding reported by a latest PMI carried on a PUSCH;

in a nineteenth to a thirty-fourth schemes, a precoding scheme is two-layer transmission, and a used precoding vector is predefined TPMIs 0 to 15;

in a thirty-fifth scheme, a precoding scheme is two-layer transmission, and a used precoding vector is precoding reported by a latest PMI carried on a PUSCH.

in a thirty-sixth to a fifty-first schemes, a precoding scheme is three-layer transmission, and a used precoding vector is predefined TPMIs 0 to 15;

in a fifty-second scheme, a precoding scheme is three-layer transmission, and a used precoding vector is precoding reported by a latest PMI carried on a PUSCH.

in a fifth-third to a sixty-eighth schemes, a precoding scheme is four-layer transmission, and a used precoding vector is predefined TPMIs 0 to 15; and in a sixty-ninth scheme, a precoding scheme is four-layer transmission, and a used precoding vector is precoding reported by a latest PMI carried on a PUSCH.

Table 13 actually merges two columns in Table 9 into one column without deletion. Advantages of the scheme are as follows: When the base station can schedule only two codewords for the UE, the base station can still use four-layer precoding to serve the UE, without reducing precoding selection flexibility, and system transmission efficiency can be maintained.

In an example, when there is only one codeword in downlink data transmission, a predefined table of a correspondence between indication information of a UE that supports transmission of a maximum of four antenna ports and used precoding may be shown in Table 14.

TABLE 14

| Bit field mapped to index | Message |
| --- | --- |
| 0 | 4 layers: Transmit diversity |
| 1 | 1 layer: TPMI = $a_0$ |
| 2 | 1 layer: TPMI = $a_1$ |
| . | . |
| . | . |
| . | . |
| 8 | 1 layer: TPMI = $a_7$ |
| 9 | 1 layer: Precoding reported by a latest PMI carried on a PUSCH is used as a precoding matrix. |
| 10 | 2 layers: TPMI = 0 |
| 11 | 2 layers: TPMI = 1 |
| . | . |
| . | . |
| . | . |
| 25 | 2 layers: TPMI = 15 |
| 26 | 2 layers: Precoding reported by a latest PMI carried on a PUSCH is used as a precoding matrix. |
| 27 | 3 layers: TPMI = 0 |
| 28 | 3 layers: TPMI = 1 |
| . | . |
| . | . |
| . | . |
| 42 | 3 layers: TPMI = 15 |
| 43 | 3 layers: Precoding reported by a latest PMI carried on a PUSCH is used as a precoding matrix. |
| 44 | 4 layers: TPMI = 0 |
| 45 | 4 layers: TPMI = 1 |
| . | . |
| . | . |
| . | . |
| 59 | 4 layers: TPMI = 15 |
| 60 | 4 layers: Precoding reported by a latest PMI carried on a PUSCH is used as a precoding matrix. |

Values of $a_0$ to $a_7$ range from integers 0 to 15, and are different from one another. For example, $a_0=0$, $a_1=1$, and $a_7=7$.

It should be noted that, an indication range of the indication information in Table 14 includes at least the foregoing 61 schemes, and may further include another scheme. This is not limited in this application. Referring to Table 14:

in a first scheme, a precoding scheme is a four-layer transmit diversity;

in a second to a ninth schemes, a precoding scheme is one-layer transmission, and a used precoding vector is predefined TPMIs $a_0$ to $a_7$;

in a tenth scheme, a precoding scheme is one-layer transmission, and a used precoding vector is precoding reported by a latest PMI carried on a PUSCH;

in an eleventh to a twenty-sixth schemes, a precoding scheme is two-layer transmission, and a used precoding vector is predefined TPMIs 0 to 15;

in a twenty-seventh scheme, a precoding scheme is two-layer transmission, and a used precoding vector is precoding reported by a latest PMI carried on a PUSCH;

in a twenty-eighth to a forty-third schemes, a precoding scheme is three-layer transmission, and a used precoding vector is predefined TPMIs 0 to 15;

in a forty-fourth scheme, a precoding scheme is three-layer transmission, and a used precoding vector is precoding reported by a latest PMI carried on a PUSCH;

in forty-fifth to a sixtieth schemes, a precoding scheme is four-layer transmission, and a used precoding vector is predefined TPMIs 0 to 15; and in a sixty-first scheme, a precoding scheme is four-layer transmission, and a used precoding vector is precoding reported by a latest PMI carried on a PUSCH.

Table 14 actually merges two columns in Table 8 into one column, and to maintain the indication information to be 6 bits, the original 16 precoding-based one-layer transmission schemes are reduced to eight. Advantages of the scheme are as follows: When the base station can schedule only one codeword for the UE, the base station can still use four-layer precoding to serve the UE, without reducing precoding selection flexibility, and system transmission efficiency can be maintained while DCI overheads remain unchanged.

In an example, when there is only one codeword in downlink data transmission, a predefined table of a correspondence between indication information of a UE that supports transmission of a maximum of four antenna ports and used precoding may be shown in Table 15.

TABLE 15

| Bit field mapped to index | Message |
|---|---|
| 0 | 4 layers: Transmit diversity |
| 1 | 1 layer: TPMI = 0 |
| 2 | 1 layer: TPMI = 1 |
| . | . |
| . | . |
| . | . |
| 16 | 1 layer: TPMI = 15 |
| 17 | 1 layer: Precoding reported by a latest PMI carried on a PUSCH is used as a precoding matrix. |
| 18 | 2 layer: TPMI = $a_0$ |
| 19 | 2 layer: TPMI = $a_1$ |
| . | . |
| . | . |
| 25 | 2 layer: TPMI = $a_7$ |
| 26 | 2 layers: Precoding reported by a latest PMI carried on a PUSCH is used as a precoding matrix. |
| 27 | 3 layers: TPMI = 0 |
| 28 | 3 layers: TPMI = 1 |
| . | . |
| . | . |
| 42 | 3 layers: TPMI = 15 |
| 43 | 3 layers: Precoding reported by a latest PMI carried on a PUSCH is used as a precoding matrix. |
| 44 | 4 layers: TPMI = 0 |
| 45 | 4 layers: TPMI = 1 |
| . | . |
| . | . |
| 59 | 4 layers: TPMI = 15 |
| 60 | 4 layers: Precoding reported by a latest PMI carried on a PUSCH is used as a precoding matrix. |

Values of $a_0$ to $a_7$ range from integers 0 to 15, and are different from one another. For example, $a_0=0$, $a_1=1$, ..., and $a_7=7$.

It should be noted that, an indication range of the indication information in Table 15 includes at least the foregoing 61 schemes, and may further include another scheme. This is not limited in this application. Referring to Table 15:

in a first scheme, a precoding scheme is a four-layer transmit diversity;

in a second to a sixteenth schemes, a precoding scheme is one-layer transmission, and a used precoding vector is predefined TPMIs 0 to 15;

in a seventeenth scheme, a precoding scheme is one-layer transmission, and a used precoding vector is precoding reported by a latest PMI carried on a PUSCH;

in an eighteenth to a twenty-sixth schemes, a precoding scheme is two-layer transmission, and a used precoding vector is predefined TPMIs $a_0$ to $a_7$;

in a twenty-seventh scheme, a precoding scheme is two-layer transmission, and a used precoding vector is precoding reported by a latest PMI carried on a PUSCH;

in a twenty-eighth to a forty-third schemes, a precoding scheme is three-layer transmission, and a used precoding vector is predefined TPMIs 0 to 15;

in a forty-fourth scheme, a precoding scheme is three-layer transmission, and a used precoding vector is precoding reported by a latest PMI carried on a PUSCH;

in forty-fifth to a sixtieth schemes, a precoding scheme is four-layer transmission, and a used precoding vector is predefined TPMIs 0 to 15; and in a sixty-first scheme, a precoding scheme is four-layer transmission, and a used precoding vector is precoding reported by a latest PMI carried on a PUSCH.

Table 15 actually merges two columns in Table 8 into one column, and to maintain the indication information to be 6 bits, the original 16 precoding-based two-layer transmission schemes are reduced to eight. Advantages of the scheme are as follows: When the base station can schedule only one codeword for the UE, the base station can still use four-layer precoding to serve the UE, without reducing precoding selection flexibility, and system transmission efficiency can be maintained while DCI overheads remain unchanged.

In an example, when there is only one codeword in downlink data transmission, a predefined table of a correspondence between indication information of a UE that supports transmission of a maximum of four antenna ports and used precoding may alternatively be shown in Table 16.

TABLE 16

| Bit field mapped to index | Message |
|---|---|
| 0 | 4 layers: Transmit diversity |
| 1 | 1 layer: TPMI = 0 |
| 2 | 1 layer: TPMI = 1 |
| . | . |
| . | . |
| 16 | 1 layer: TPMI = 15 |
| 17 | 1 layer: Precoding reported by a latest PMI carried on a PUSCH is used as a precoding matrix. |
| 18 | 2 layers: TPMI = 0 |
| 19 | 2 layers: TPMI = 1 |
| . | . |
| . | . |
| 33 | 2 layers: TPMI = 15 |
| 34 | 2 layers: Precoding reported by a latest PMI carried on a PUSCH is used as a precoding matrix. |
| 35 | 3 layer: TPMI = $a_0$ |

TABLE 16-continued

| Bit field mapped to index | Message |
|---|---|
| 36 | 3 layer: TPMI = $a_1$ |
| . | . |
| . | . |
| . | . |
| 42 | 3 layer: TPMI = $a_7$ |
| 43 | 3 layers: Precoding reported by a latest PMI carried on a PUSCH is used as a precoding matrix. |
| 44 | 4 layers: TPMI = 0 |
| 45 | 4 layers: TPMI = 1 |
| . | . |
| . | . |
| . | . |
| 59 | 4 layers: TPMI = 15 |
| 60 | 4 layers: Preceding reported by a latest PMI carried on a PUSCH is used as a precoding matrix. |

Values of $a_0$ to $a_7$ range from integers 0 to 15, and are different from one another. For example, $a_0=0$, $a_1=1$, ..., and $a_7=7$.

It should be noted that, an indication range of the indication information in Table 16 includes at least the foregoing 61 schemes, and may further include another scheme. This is not limited in this application Referring to Table 16:
in a first scheme, a precoding scheme is a four-layer transmit diversity:
in a second to a sixteenth schemes, a precoding scheme is one-layer transmission, and a used precoding vector is predefined TPMIs 0 to 15;
in a seventeenth scheme, a precoding scheme is one-layer transmission, and a used precoding vector is precoding reported by a latest PMI carried on a PUSCH;
in an eighteenth to a thirty-fourth schemes, a precoding scheme is two-layer transmission, and a used precoding vector is predefined TPMIs 0 to 15;
in a thirty-fifth scheme, a precoding scheme is two-layer transmission, and a used precoding vector is precoding reported by a latest PMI carried on a PUSCH;
in a thirty-sixth to a forty-third schemes, a precoding scheme is three-layer transmission, and a used precoding vector is predefined TPMIs $a_0$ to $a_7$;
in a forty-fourth scheme, a precoding scheme is three-layer transmission, and a used precoding vector is precoding reported by a latest PMI carried on a PUSCH;
in forty-fifth to a sixtieth schemes, a precoding scheme is four-layer transmission, and a used precoding vector is predefined TPMIs 0 to 15; and in a sixty-first scheme, a precoding scheme is four-layer transmission, and a used precoding vector is precoding reported by a latest PMI carried on a PUSCH.

Table 16 actually merges two columns in Table 8 into one column, and to maintain the indication information to be 6 hits, the original 16 precoding-based three-layer transmission schemes are reduced to eight. Advantages of the scheme are as follows: When the base station can schedule only one codeword for the UE, the base station can still use four-layer precoding to serve the UE, without reducing precoding selection flexibility, and system transmission efficiency can be maintained while DCI overheads remain unchanged.

In an example, when there is only one codeword in downlink data transmission, a predefined table of a correspondence between indication information of a UE that supports transmission of a maximum of four antenna ports and used precoding may alternatively be shown in Table 17.

TABLE 17

| Bit field mapped to index | Message |
|---|---|
| 0 | 4 layers: Transmit diversity |
| 1 | 1 layer: TPMI = 0 |
| 2 | 1 layer: TPMI = 1 |
| . | . |
| . | . |
| . | . |
| 16 | 1 layer: TPMI = 15 |
| 17 | 1 layer: Precoding reported by a latest PMI carried on a PUSCH is used as a precoding matrix. |
| 18 | 2 layers: TPMI = 0 |
| 19 | 2 layers: TPMI = 1 |
| . | . |
| . | . |
| . | . |
| 33 | 2 layers: TPMI = 15 |
| 34 | 2 layers: Precoding reported by a latest PMI carried on a PUSCH is used as a precoding matrix. |
| 35 | 3 layers: TPMI = 0 |
| 36 | 3 layers: TPMI = 1 |
| . | . |
| . | . |
| . | . |
| 50 | 3 layers: TPMI = 15 |
| 51 | 3 layers: Precoding reported by a latest PMI carried on a PUSCH is used as a precoding matrix. |
| 52 | 4 layer: TPMI = $a_0$ |
| 53 | 4 layer: TPMI = $a_1$ |
| . | . |
| . | . |
| . | . |
| 59 | 4 layer: TPMI = $a_7$ |
| 60 | 4 layers: Preceding reported by a latest PMI carried on a PUSCH is used as a precoding matrix. |

Values of $a_0$ to $a_7$ range from integers 0 to 15, and are different from one another. For example, $a_0=0$, $a_1=1$, ..., and $a_7=7$.

It should be noted that, an indication range of the indication information in Table 17 includes at least the foregoing 61 schemes, and may further include another scheme. This is not limited in this application. Referring to Table 17:
in a first scheme, a precoding scheme is a four-layer transmit diversity;
in a second to a sixteenth schemes, a precoding scheme is one-layer transmission, and a used precoding vector is predefined TPMIs 0 to 15;
in a seventeenth scheme, a precoding scheme is one-layer transmission, and a used precoding vector is precoding reported by a latest PMI carried on a PUSCH;
in an eighteenth to a thirty-fourth schemes, a precoding scheme is two-layer transmission, and a used precoding vector is predefined TPMIs 0 to 15;
in a thirty-fifth scheme, a precoding scheme is two-layer transmission, and a used precoding vector is precoding reported by a latest PMI carried on a PUSCH;
in a thirty-sixth to a fifty-first schemes, a precoding scheme is three-layer transmission, and a used precoding vector is predefined TPMIs $a_0$ to $a_7$;

in a fifty-second scheme, a precoding scheme is three-layer transmission, and a used precoding vector is precoding reported by a latest PMI carried on a PUSCH;

in a fifty-third to a sixtieth schemes, a precoding scheme is four-layer transmission, and a used precoding vector is predefined. TPMIs $a_0$ to $a_7$; and in a sixty-first scheme, a precoding scheme is four-layer transmission, and a used precoding vector is precoding reported by a latest PMI carried on a PUSCH.

Table 17 actually merges two columns in Table 8 into one column, and to maintain the indication information to be 6 bits, the original 16 precoding-based four-layer transmission schemes are reduced to eight. Advantages of the scheme are as follows: When the base station can schedule only one codeword for the UE, the base station can still use four-layer precoding to serve the UE, without reducing precoding selection flexibility, and system transmission efficiency can be maintained while DCI overheads remain unchanged.

The solutions provided in the embodiments of this application are mainly described above from a perspective of interaction between the network elements. It may be understood that, to implement the foregoing functions, the network elements such as the network device and the terminal device include corresponding hardware structures and/or software modules for performing the functions. A person skilled in the art should be easily aware that units and algorithm steps in the examples described with reference to the embodiments disclosed in this specification may be implemented in a form of hardware or in a form of a combination of hardware and computer software in this application. Whether the functions are performed by hardware or computer software driving hardware depends on particular applications and design constraint conditions of the technical solutions. A person skilled in the art may use different methods to implement the described functions for each particular application, but it should not be considered that the implementation goes beyond the scope of this application.

In the embodiments of this application, function modules of the network device, the terminal device, and the like may be divided based on the foregoing method examples. For example, each function module may be obtained through division based on each corresponding function, or two or more functions may be integrated into one processing module. The integrated module may be implemented in a form of hardware, or may be implemented in a form of a software function module. It should be noted that the module division in the embodiments of this application is an example, and is merely logical function division. There may be another division manner in an actual implementation.

Figure 11:
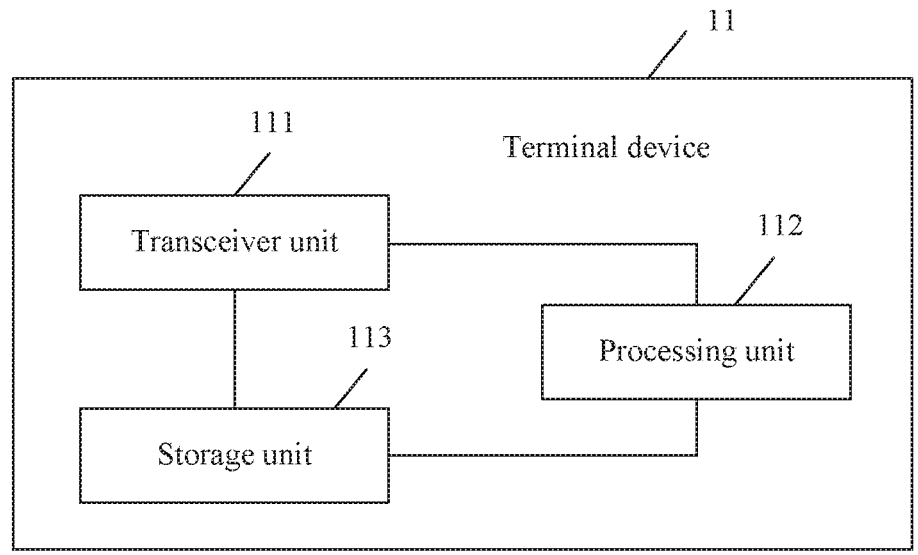
FIG. 11 is a schematic structural diagram of a terminal device according to an embodiment of this application.

When each function module is obtained through division based on each corresponding function, FIG. 11 is a possible schematic structural diagram of a terminal device according to the foregoing embodiment. The terminal device 11 includes a transceiver unit 111, a processing unit 112, and a storage unit 113. The transceiver unit 111 is configured to support the terminal device in performing the process 803 in FIG. 8, the process 103 in FIG. 10, and the process 1043 in FIG. 104. The processing unit 102 is configured to support the terminal device in performing the process 804 in FIG. 8, the process 104A in FIG. 104, and the process 104 in FIG. 10. The storage unit 103 may store an application program, data, and the like for performing steps 803 and 804 in the method in this application, where the data includes at least one of the newly configured Table 4, Table 5, Table 6, and Table 7 in this application; and/or store an application program, a calculation formula, and the like for performing steps 103 and 104 in the method in this application. For the function descriptions of the corresponding function modules, refer to any content related to the steps in the foregoing method embodiments and a newly configured table. Details are not described herein again.

Figure 12:
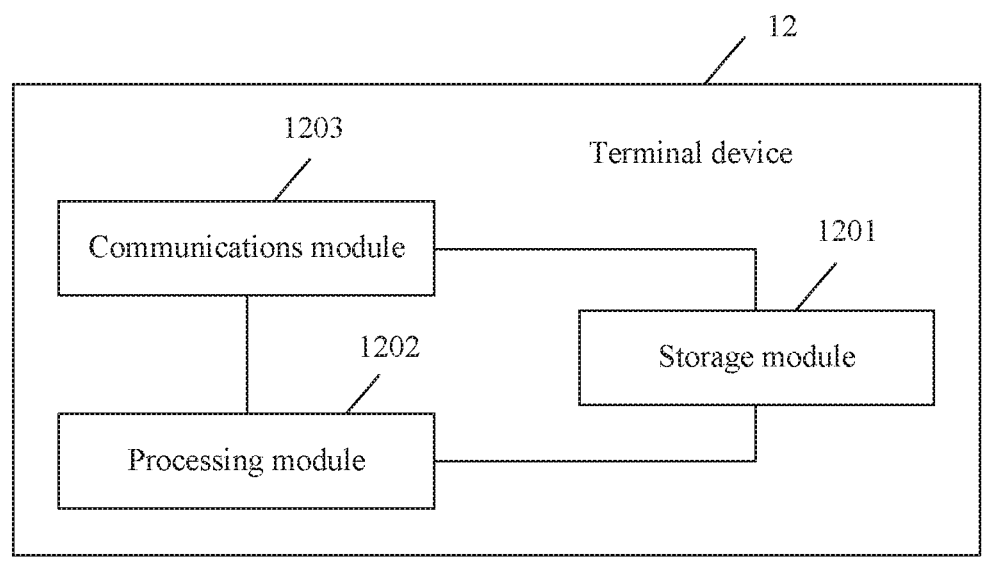
FIG. 12 is a schematic structural diagram of a terminal device according to an embodiment of this application.

When an integrated unit is used, FIG. 12 is a possible schematic structural diagram of a terminal device according to the foregoing embodiment. The terminal device 12 includes a processing module 1202 and a communications module 1203. The processing module 1202 is configured to control and manage actions of the terminal device. For example, the processing module 1202 is configured to support the terminal device in performing the process 804 in FIG. 8, the process 104 in FIG. 10, and the process 1044 in FIG. 104, and/or is configured to perform another process of the technology described in this specification. The communications module 1203 is configured to support the terminal device in communicating with another network entity, for example, communicating with the network device shown in FIG. 5. The terminal device 12 may further include a storage module 1201, configured to store program code and data of the terminal device, where the program code may be used to perform steps 803 and 804 in the method in this application, steps 103 and 104 in FIG. 10, and steps 1043 and 1044 in FIG. 104, and the data includes at least one of the newly configured Table 4, Table 5, Table 6, and Table 7 to Table 17 in this application; and/or store an application program, a calculation formula, and the like in steps 103 and 104 in the method in this application.

The processing module 1202 may be a processor or a controller, for example, may be a central processing unit (CPU), a general purpose processor, a digital signal processor (DSP), an application-specific integrated circuit (ASIC), a field programmable gate array (FPGA) or another programmable logic device, a transistor logic device, a hardware component, or any combination thereof. It may implement or execute various example logical blocks, modules, and circuits that are described with reference to the content disclosed in this application. The processor may also be a combination implementing a computing function, for example, a combination including one or more microprocessors or a combination of a DSP and a microprocessor. The communications module 1203 may be a transceiver, a transceiver circuit, a communications interface, or the like. The storage module 1201 may be a memory.

Figure 13:
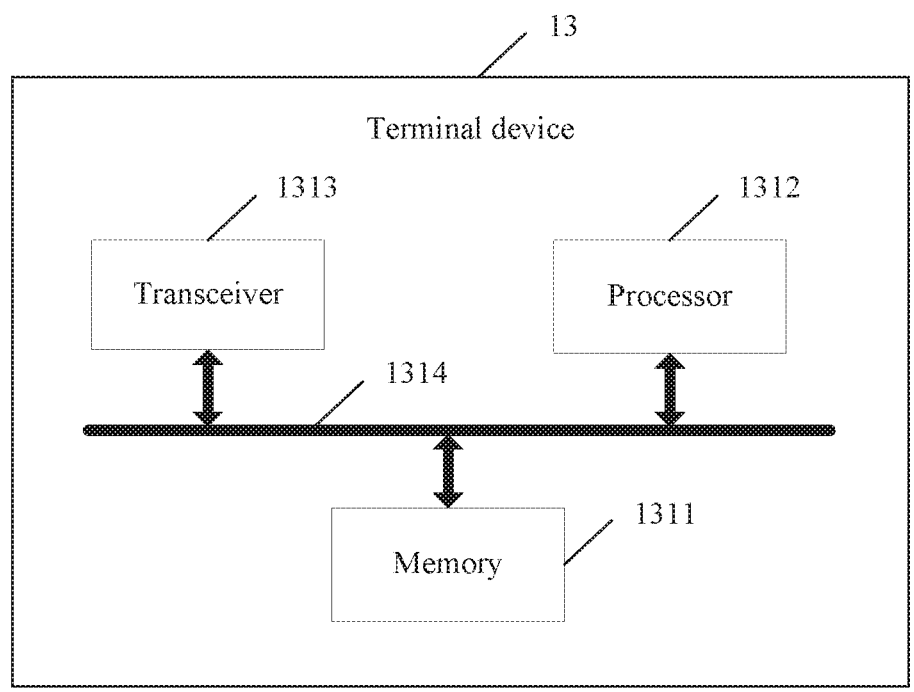
FIG. 13 is a schematic structural diagram of a terminal device according to an embodiment of this application.

When the processing module 1202 is a processor, the communications module 1203 is a transceiver, and the storage module 1201 is a memory, the terminal device in this embodiment of this application may be the terminal device shown in FIG. 13.

Referring to FIG. 13, the terminal device 13 includes a processor 1312, a transceiver 1313, a memory 1311, and a bus 1314. The transceiver 1313, the processor 1312, and the memory 1311 are connected to each other by using the bus 1314. The bus 1314 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 13, but this does not mean that there is only one bus or only one type of bus.

Figure 14:
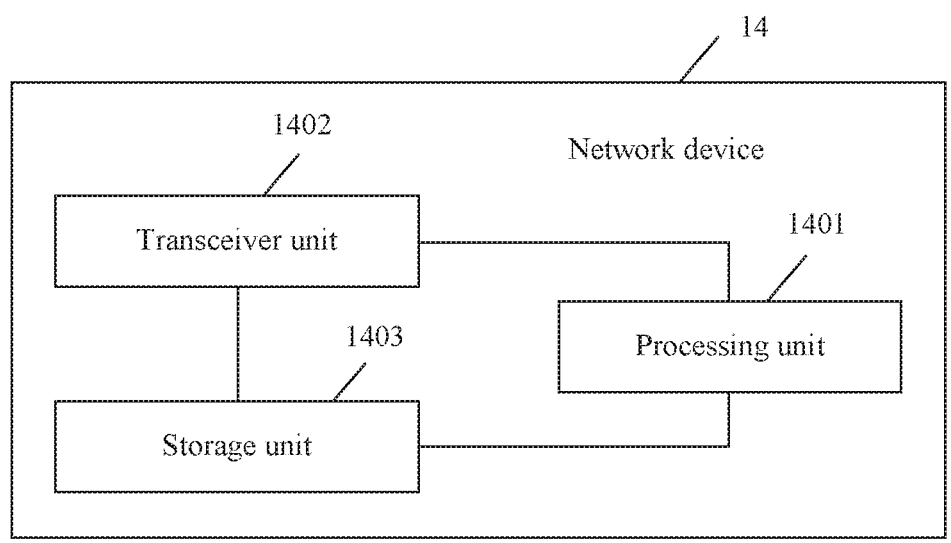
FIG. 14 is a schematic structural diagram of a network device according to an embodiment of this application.

When each function module is obtained through division based on each corresponding function, FIG. 14 is a possible schematic structural diagram of a network device according to the foregoing embodiment. The network device 14 includes a processing unit 1401, a transceiver unit 1402, and a storage unit 1403. The processing unit 1401 is configured to support the network device in performing the process 801 in FIG. 8 and the process 101 in FIG. 10. The transceiver unit 1402 is configured to support the network device in performing the process 802 in FIG. 8 and the process 102 in FIG. 10. The storage unit 1403 is configured to store an application program and data, for example, store an application program corresponding to steps 801 and 802, and at least one of Table 4, Table 5, Table 6, and Table 7 to Table 17, and/or store an application program corresponding to steps 101 and 102, a related calculation formula, and the like. For the function descriptions of the corresponding function modules, refer to any content related to the steps in the foregoing method embodiments, Details are not described herein again.

Figure 15:
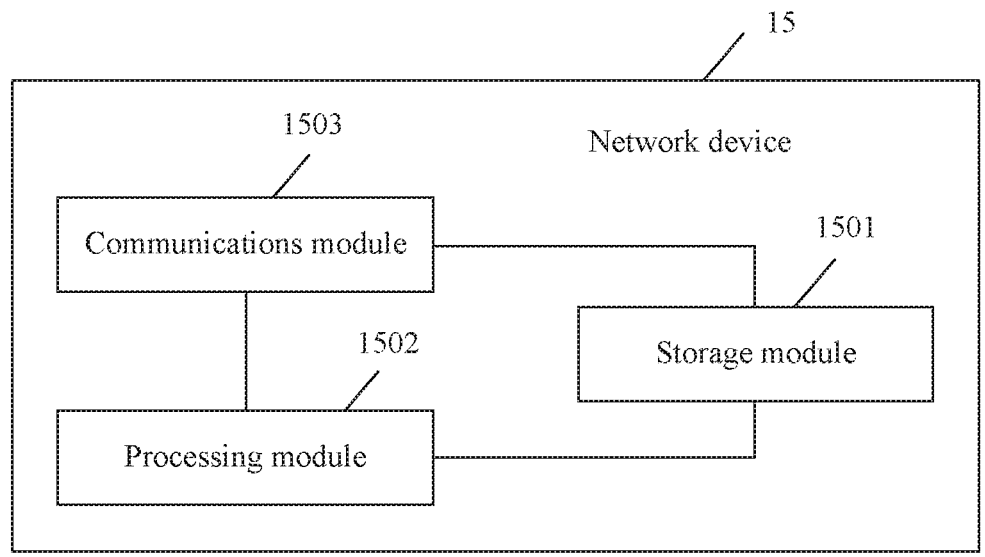
FIG. 15 is a schematic structural diagram of a network device according to an embodiment of this application.

When an integrated unit is used, FIG. 15 is a possible schematic structural diagram of a network device according to the foregoing embodiment. The network device 15 includes a processing module 1502 and a communications module 1503. The processing module 1502 is configured to control and manage actions of the network device. For example, the processing module 1502 is configured to support the network device in performing the process 801 in FIG. 8 and the process 101 in FIG. 10, and/or is configured to perform another process of the technology described in this specification. The communications module 1503 is configured to support the network device in communicating with another network entity, for example, communicating with a terminal device shown in FIG. 5. The network device may further include a storage module 1501, configured to store program code and data of the network device, for example, store an application program corresponding to steps 801 and 802, and at least one of Table 4, Table 5, Table 6, and Table 7 to Table 17, and/or an application program corresponding to steps 101 and 102 in FIG. 10, a related calculation formula, and the like.

The processing module 1502 may be a processor or a controller, for example, may be a CPU, a general purpose processor, a DSP, an ASIC, an FPGA or another programming logic device, a transistor logic device, a hardware component, or any combination thereof. It may implement or execute various example logical blocks, modules, and circuits that are described with reference to the content disclosed in this application. The processor may also be a combination implementing a computing function, for example, a combination including one or more microprocessors or a combination of a DSP and a microprocessor. The communications module 1503 may be a transceiver, a transceiver circuit, a communications interface, or the like. The storage module 1501 may be a memory.

Figure 16:
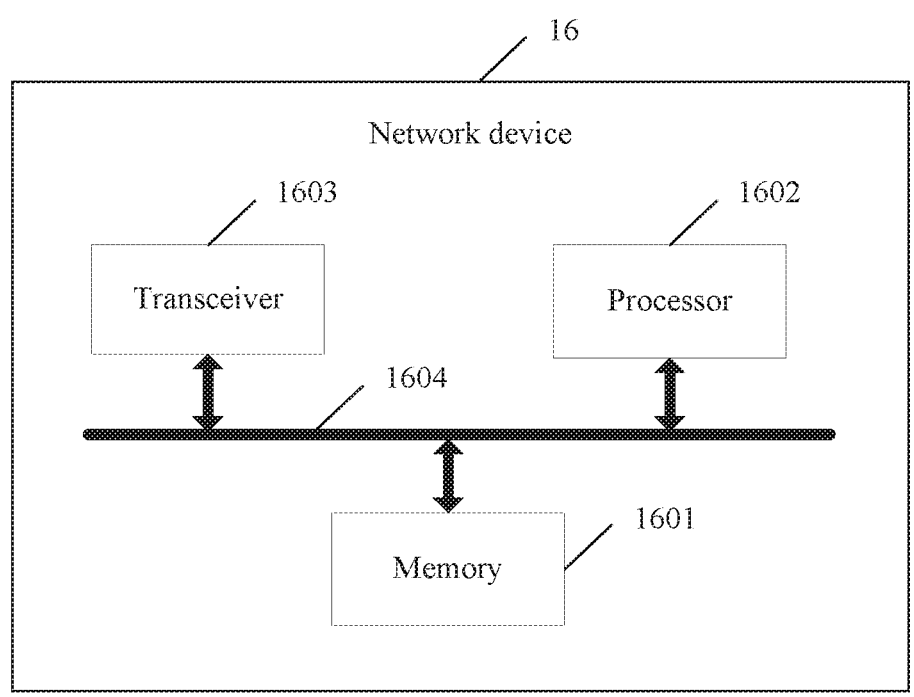
FIG. 16 is a schematic structural diagram of a network device according to an embodiment of this application.

When the processing module 1502 is a processor, the communications module 1503 is a transceiver, and the storage module 1501 is a memory, the network device in this embodiment of this application may be the network device shown in FIG. 16.

Referring to FIG. 16, the network device 16 includes a processor 1602, a transceiver 1603, a memory 1601, and a bus 1604. The transceiver 1603, the processor 1602, and the memory 1601 are connected to each other by using the bus 1604. The bus 1604 may be a PCI bus, an EISA bus, or the like. The bus may be classified into an address bus, a data bus, a control bus, and the like. For ease of representation, only one thick line is used to represent the bus in FIG. 16, but this does not mean that there is only one bus or only one type of bus.

Method or algorithm steps described in combination with the content disclosed in this application may be implemented by hardware, or may be implemented by a processor by executing software instructions. The software instructions may include a corresponding software module. The software module may be stored in a random access memory (RAM), a flash memory, a read-only memory (ROM), an erasable programmable read only memory (EPROM), an electrically erasable programmable read-only memory (EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in a core network interface device. Certainly, the processor and the storage medium may exist in the core network interface device as discrete components.

A person skilled in the art should be aware that in the foregoing one or more examples, functions described in this application may be implemented by hardware, software, firmware, or any combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The foregoing descriptions are merely specific implementations of this application, but are not intended to limit the protection scope of this application. Any variation or replacement within the technical scope disclosed in this application shall fall within the protection scope of this application. Therefore, the protection scope of this application shah be subject to the protection scope of the claims.

What is claimed is:

1. A method for receiving downlink control information (DCI), the method comprising:
   receiving, by an apparatus, DCI for scheduling downlink data to be transmitted as one codeword on a downlink channel, wherein the DCI is represented by 6 bits and comprises a value selected from a set of values, wherein the set of values comprises:
   a first value indicating that a precoding scheme for the downlink channel adopts a four-layer transmit diversity;
   a second value to a seventeenth value, each indicating that the precoding scheme adopts a one-layer transmission and uses precoding matrices determined based on transmit precoding matrix indications (TPMIs) with values between 0 and 15;
   an eighteenth value indicating that the precoding scheme adopts a one-layer transmission, and precoding reported by a latest precoding matrix indication (PMI) carried on a physical uplink shared channel (PUSCH) is used as a precoding matrix;
   a nineteenth value to a thirty-fourth value indicating that the precoding scheme adopts a two-layer transmission and uses precoding matrices determined based on TPMIs with values between 0 and 15;

a thirty-fifth value indicating that a precoding scheme adopts two-layer transmission, and precoding reported by the latest PMI carried on the PUSCH is used as the precoding matrix;

a thirty-sixth value to a fifty-first value indicating that a precoding scheme adopts a three-layer transmission, and uses precoding matrices determined based on TPMIs with values between 0 and 15;

a fifty-second value indicating that the precoding scheme adopts a three-layer transmission, and precoding reported by the latest PMI carried on the PUSCH is used as the precoding matrix; and a fifty-third value to a sixtieth value indicating that the precoding scheme adopts a four-layer transmission, and uses precoding matrices determined based on TPMIs with values between 0 and 15; and determining, by the apparatus, the precoding matrix for the downlink data based on the DCI.

2. The method according to claim 1, wherein the set of values further comprises:

a value indicating that a precoding scheme adopts a four-layer transmission, and precoding reported by the latest PMI carried on the PUSCH is used as the precoding matrix.

3. The method according to 1, further comprising: receiving, by the apparatus, the downlink data.

4. A communications apparatus, comprising a memory and one or more processors, wherein the memory stores programming instructions for execution by the one or more processors, the programming instructions instruct the communications apparatus to perform operations comprising:

receiving, by an apparatus, DCI for scheduling downlink data to be transmitted as one codeword on a downlink channel, wherein the DCI is represented by 6 bits and comprises a value selected from a set of values, wherein the set of values comprises:

a first value indicating that a precoding scheme for the downlink channel adopts a four-layer transmit diversity;

a second value to a seventeenth value, each indicating that the precoding scheme adopts a one-layer transmission and uses precoding matrices determined based on transmit precoding matrix indications (TPMIs) with values between 0 and 15;

an eighteenth value indicating that the precoding scheme adopts a one-layer transmission, and precoding reported by a latest precoding matrix indication (PMI) carried on a physical uplink shared channel (PUSCH) is used as a precoding matrix;

a nineteenth value to a thirty-fourth value indicating that the precoding scheme adopts a two-layer transmission and uses precoding matrices determined based on TPMIs with values between 0 and 15;

a thirty-fifth value indicating that a precoding scheme adopts two-layer transmission, and precoding reported by the latest PMI carried on the PUSCH is used as the precoding matrix;

a thirty-sixth value to a fifty-first value indicating that a precoding scheme adopts a three-layer transmission, and uses precoding matrices determined based on TPMIs with values between 0 and 15;

a fifty-second value indicating that the precoding scheme adopts a three-layer transmission, and precoding reported by the latest PMI carried on the PUSCH is used as the precoding matrix; and a fifty-third value to a sixtieth value indicating that the precoding scheme adopts a four-layer transmission, and uses precoding matrices determined based on TPMIs with values between 0 and 15; and determining, by the apparatus, the precoding matrix for the downlink data based on the DCI.

5. The apparatus according to claim 4, wherein the set of values further comprises:

a value indicating that a precoding scheme adopts a four-layer transmission, and precoding reported by the latest PMI carried on the PUSCH is used as the precoding matrix.

6. The communications apparatus according to 4, wherein the operations further comprising:

receiving the downlink data.

7. A method for sending downlink control information, comprising:

generating downlink control information (DCI) for scheduling downlink data to be transmitted on a downlink channel using one codeword, wherein the DCI is represented by 6 bits and comprises a value selected from a set of values, wherein the set of values comprises:

a first value indicating that a precoding scheme for the downlink channel adopts a four-layer transmit diversity;

a second value to a seventeenth value, each indicating that the precoding scheme adopts a one-layer transmission and uses precoding matrices determined based on transmit precoding matrix indications (TPMIs) with values between 0 and 15;

an eighteenth value indicating that the precoding scheme adopts a one-layer transmission, and precoding reported by a latest precoding matrix indication (PMI) carried on a physical uplink shared channel (PUSCH) is used as a precoding matrix;

a nineteenth value to a thirty-fourth value indicating that the precoding scheme adopts a two-layer transmission and uses precoding matrices determined based on TPMIs with values between 0 and 15;

a thirty-fifth value indicating that a precoding scheme adopts two-layer transmission, and precoding reported by the latest PMI carried on the PUSCH is used as the precoding matrix;

a thirty-sixth value to a fifty-first value indicating that a precoding scheme adopts a three-layer transmission, and uses precoding matrices determined based on TPMIs with values between 0 and 15;

a fifty-second value indicating that the precoding scheme adopts a three-layer transmission, and precoding reported by the latest PMI carried on the PUSCH is used as the precoding matrix; and a fifty-third value to a sixtieth value indicating that the precoding scheme adopts a four-layer transmission, and uses precoding matrices determined based on TPMIs with values between 0 and 15;

determining, by the apparatus, the precoding matrix for the downlink data based on the DCI; and sending the DCI to a communications apparatus.

8. The method according to claim 7, wherein the set of values further comprises:

a value indicating that a precoding scheme adopts a four-layer transmission, and precoding reported by the latest PMI carried on the PUSCH is used as the precoding matrix.

9. The method according to 7, further comprising: sending the downlink data to the communications apparatus.

10. A communications apparatus, comprising a memory and one or more processors, wherein the memory stores programming instructions for execution by the one or more processors, the programming instructions instruct the communications apparatus to perform operations comprising:
generating downlink control information (DCI) for scheduling downlink data to be transmitted on a downlink channel using one codeword, wherein the DCI is represented by 6 bits and comprises a value selected from a set of values, wherein the set of values comprises:
a first value indicating that a precoding scheme for the downlink channel adopts a four-layer transmit diversity;
a second value to a seventeenth value, each indicating that the precoding scheme adopts a one-layer transmission and uses precoding matrices determined based on transmit precoding matrix indications (TPMIs) with values between 0 and 15;
an eighteenth value indicating that the precoding scheme adopts a one-layer transmission, and precoding reported by a latest precoding matrix indication (PMI) carried on a physical uplink shared channel (PUSCH) is used as a precoding matrix;
a nineteenth value to a thirty-fourth value indicating that the precoding scheme adopts a two-layer transmission and uses precoding matrices determined based on TPMIs with values between 0 and 15;
a thirty-fifth value indicating that a precoding scheme adopts two-layer transmission, and precoding reported by the latest PMI carried on the PUSCH is used as the precoding matrix;
a thirty-sixth value to a fifty-first value indicating that a precoding scheme adopts a three-layer transmission, and uses precoding matrices determined based on TPMIs with values between 0 and 15;
a fifty-second value indicating that the precoding scheme adopts a three-layer transmission, and precoding reported by the latest PMI carried on the PUSCH is used as the precoding matrix; and
a fifty-third value to a sixtieth value indicating that the precoding scheme adopts a four-layer transmission, and uses precoding matrices determined based on TPMIs with values between 0 and 15;
determining the precoding matrix for the downlink data based on the DCI; and
sending the DCI to another communications apparatus.

11. The communications apparatus according to claim 10, wherein the set of values further comprises:
a value indicating that a precoding scheme adopts a four-layer transmission, and precoding reported by the latest PMI carried on the PUSCH is used as the precoding matrix.

12. The communications apparatus according to claim 10, wherein the operations further comprising:
sending the downlink data to the another communications apparatus.

* * * * *

UNITED STATES PATENT AND TRADEMARK OFFICE
CERTIFICATE OF CORRECTION

Page 1 of 1

PATENT NO. : 10,992,502 B2
APPLICATION NO. : 16/730314
DATED : April 27, 2021
INVENTOR(S) : Liyan Su et al.

It is certified that error appears in the above-identified patent and that said Letters Patent is hereby corrected as shown below:

In the Claims

In Column 39, Line 25, in Claim 3, delete "to" and insert -- to claim --, therefor.

In Column 40, Line 11, in Claim 6, delete "to" and insert -- to claim --, therefor.

In Column 40, Line 63, in Claim 9, delete "to" and insert -- to claim --, therefor.

Signed and Sealed this
Seventeenth Day of August, 2021

Drew Hirshfeld
*Performing the Functions and Duties of the
Under Secretary of Commerce for Intellectual Property and
Director of the United States Patent and Trademark Office*